United States Patent
Takizawa et al.

(10) Patent No.: US 6,783,850 B2
(45) Date of Patent: Aug. 31, 2004

(54) ACRYLIC POLYMER COMPOSITIONS, ACRYLIC PRESSURE-SENSITIVE ADHESION TAPES AND PROCESS FOR PRODUCING THE SAME

(75) Inventors: Youichi Takizawa, Sayama (JP); Mitsuhiko Nakazawa, Sayama (JP)

(73) Assignee: Soken Chemical & Engineering Co., Ltd., Tokyo (JP)

( * ) Notice: Subject to any disclaimer, the term of this patent is extended or adjusted under 35 U.S.C. 154(b) by 0 days.

(21) Appl. No.: 10/168,551

(22) PCT Filed: Dec. 15, 2000

(86) PCT No.: PCT/JP00/08932

§ 371 (c)(1),
(2), (4) Date: Jun. 21, 2002

(87) PCT Pub. No.: WO01/46328

PCT Pub. Date: Jun. 28, 2001

(65) Prior Publication Data

US 2003/0008140 A1 Jan. 9, 2003

(30) Foreign Application Priority Data

Dec. 22, 1999 (JP) .......................................... 11-364883

(51) Int. Cl.[7] .............................................. B32B 27/30
(52) U.S. Cl. ............................... 428/355 AC; 525/227; 525/228; 524/523; 524/526
(58) Field of Search ................................. 525/227, 228, 525/222; 524/523, 526; 428/355 AC; 427/385.5; 522/104, 106, 107

(56) References Cited

PUBLICATIONS

Machine Translation, JP 2000–313704, Takizawa et al., Nov. 14, 2000.*
Machine Translation, JP 09–151364, Moroishi et al., Jun. 10, 1997.*
Machine Translation, JP 09–208910, Tomita et al., Aug. 12, 1997.*
Patent Abstracts of Japan, JP 2001–049200, Feb. 20, 2001, Soken Chem. & Eng. Co., Ltd.
Patent Abstracts of Japan, 2000–313704, Nov. 14, 2000, Soken Chem. & Eng. Co., Ltd.
Patent Abstracts of Japan, 09–151364, Jun. 10, 1997, Nitto Denko Corp.
Patent Abstracts of Japan, JP 09–208910, Aug. 12, 1997, Soken Chem. & Eng. Co., Ltd.
Patent Abstracts of Japan, JP 06–287529, Oct. 11, 1994, Sekisui Chem. Co., Ltd.
Patent Abstracts of Japan, JP 11–140138, May 25, 1999, Sekisui Chem. Co., Ltd.
Patent Abstracts of Japan, JP 06–166859, Jun. 14, 1994, Sekisui Chem. Co., Ltd.
Patent Abstracts of Japan, JP 06–346026, Dec. 20, 1994, Mitsui Toatsu Chem., Inc.
Patent Abstracts of Japan, JP 06–05216, Mar. 01, 1994, Nitto Denko Corp.
Patent Abstracts of Japan, JP 02–248482, Oct. 04, 1990, Fujikara Kasei Co., Ltd.

* cited by examiner

*Primary Examiner*—David J. Buttner
*Assistant Examiner*—Christopher Keehan
(74) *Attorney, Agent, or Firm*—Webb Ziesenheim Logsdon Orkin & Hanson, P.C.

(57) ABSTRACT

An acrylic pressure sensitive adhesive composition comprising 5 to 75 parts by weight of an adherent polymer (a) comprising (meth)acrylic ester component units as principal structural units and having a weight average molecular weight of 50,000 or more; 5 to 40 parts by weight of a tackifier resin (b) comprising (meth)acrylic ester component units as principal structural units and having a weight average molecular weight of 20,000 or less; and 20 to 90 parts by weight of monomers (c) whose principal component is a (meth)acrylic ester, wherein substantially no solvent is contained is provided. Further, a pressure sensitive adhesive tape having a pressure sensitive adhesive layer superimposed on a support surface is provided by coating the support surface with the above acrylic pressure sensitive adhesive composition, which contain a partial polymerizate, and carrying out a polymerization reaction on the support surface.

61 Claims, No Drawings

ACRYLIC POLYMER COMPOSITIONS, ACRYLIC PRESSURE-SENSITIVE ADHESION TAPES AND PROCESS FOR PRODUCING THE SAME

BACKGROUND OF THE INVENTION

1. Field of the Invention

The present invention relates to an acrylic polymer composition wherein substantially no solvent is contained, an acrylic pressure sensitive adhesive tape prepared with the use thereof and processes for producing these.

2. Description of the Prior Art

Acrylic monomers have excellent polymerizability, and can be polymerized by various reaction systems including the solution polymerization, suspension polymerization, emulsion polymerization and bulk polymerization techniques.

For example, the following processes have been proposed for production of acrylic polymers. One process comprises heating a mixture of an acrylic monomer and a mercaptan at a temperature ranging from 20 to 200° C. in the presence of oxygen to there by effect a bulk polymerization thereof (see Japanese Patent Publication No. 50(1975)-401). Another process comprises polymerizing a mixture of an acrylic monomer and a mercaptan wherein substantially no initiator is contained in a nitrogen atmosphere (see Japanese Patent No. 258,251). A further process comprises carrying out polymerization with the use of an extrusion type barrel apparatus, in place of a batch reaction vessel, at high temperatures (near 150° C.) (see Japanese Patent Publication No. 2(1990)-55448). Still a further process comprises irradiating a batch reaction vessel with UV light through an optical fiber and carrying out polymerization by pulse irradiation of UV light (see Japanese Patent Laid-open Publication No. 7(1995)-330815). Yet still a further process comprises carrying out a UV bulk polymerization by stepwise changing the reaction temperature while irradiating a batch reaction vessel with UV light (see Japanese Patent Laid-open Publication No. 11(1999)-49811).

However, when it is intended to react acrylic monomers in the presence of a heat decomposable polymerization initiator in conventional batch reaction vessels of industrial scale, because of the high reactivity of acrylic monomers, the heat generation in the reactor (reaction vessels) is so intense that it is difficult to expel the heat of reaction toward outside of the reaction system. Therefore, it has been impracticable to accomplish a bulk polymerization of acrylic monomer in the presence of a heat decomposable polymerization initiator in reaction vessels while effectively controlling the reaction.

The reaction using a barrel apparatus has a drawback in that it is needed to set the reaction temperature so as to fall within a high temperature region with the result that, in accordance with the lowering of precision of temperature control, the molecular weight distribution of obtained polymer will be broadened and the molecular weight of obtained polymer will become polydisperse.

With respect to the barrel apparatus including UV irradiation means, temperature control is difficult, so that a reaction control of high precision cannot be effected. Further, with respect to the batch reaction vessel equipped with UV irradiation means, the cost on cooling facilities for controlling the heat generation accompanied with scale increase is so large that it is not suitable for mass production of an acrylic polymer by the use of existing facilities.

On the other hand, as aforementioned, the bulk polymerization technique is known as a method of polymerizing an acrylic monomer. In the bulk polymerization, the produced polymer does not contain solvents and does not contain surfactants and the like. Thus, in the bulk polymerization, an operation of separating solvents from the produced polymer is not needed. The produced polymer does not contain surfactants and other matters which are likely to cause deterioration of water resistance and other properties. For these reasons, the bulk polymerization, when assessed only from the viewpoint of reaction mode, provides a preferable reaction mode.

However, in the bulk polymerization wherein use is made of a thermal polymerization initiator, it is extremely difficult to control the thermal polymerization reaction because of the high reactivity of monomers used, so that the runaway of polymerization reaction is likely to occur. The runaway reaction means a phenomenon such that the reaction can no longer be controlled to thereby cause violent advance of the reaction. That is, the runaway reaction is extremely dangerous because of a rapid change of the state of components charged in the reactor, for example, a rapid rise of the reaction temperature. Moreover, the molecular weight distribution of produced polymer tends to be broad, and the molecular weight of obtained polymer tends to be low.

With respect to the bulk polymerization technique wherein an acrylic monomer is used, Japanese Patent Laid-open Publication No. 53(1978)-2589 discloses a process for producing a thermosetting acrylic resin, comprising polymerizing a mixture or syrup of a (meth)acrylic ester and a crosslinking monomer, wherein first a prepolymer with a polymerization degree of 60% or more is produced at 150° C. or below in a vessel type reactor, the prepolymer is taken out from the vessel type reactor, and further polymerization of the prepolymer is conducted through multi-stage polymerization steps set for 10 to 60% polymerization degree differences. In the Example section of the published specification, azobisisobutyronitrile, tert-butyl peroxylaurate or the like is used in an amount of about 0.01 to 0.3 part by weight per 100 parts by weight of monomer. The 10-hr half-life temperature of azobisisobutyronitrile is 66° C. The 10-hr half-life temperature of tert-butyl peroxylaurate is 98.3° C. If these thermal polymerization initiators of high 10-hr half-life temperatures are used for the above monomers in an amount of about 0.01 to 0.3 part by weight, the temperature of reaction system would rapidly rise simultaneously with the initiation of reaction. Thus, the reaction would run away unless a cooling unit of high performance is provided. Therefore, in the invention described in the published specification, it is inevitably needed to advance multi-stage polymerization reaction while effecting satisfactory cooling so as to prevent the runaway of reaction at each stage with the use of a reactor equipped with a cooling unit of satisfactory cooling capacity. Consequently, in the process described in the published specification, a high-performance equipment must be installed for cooling the reaction system.

Furthermore, Japanese Patent Laid-open Publication No. 58(1983)-87171 discloses a process for producing an acrylic pressure sensitive adhesive of 100 thousand to 600 thousand of weight average molecular weight, which comprises the first stage wherein 0.00005 to 0.5 part by weight of a thermal polymerization initiator whose half-life period is in the range of 0.1 to 1000 hr at 70° C. and in the range of 0.1 to 5 hr at the polymerization initiation temperature is mixed with 100 parts by weight of an acrylic monomer and the acrylic monomer is polymerized at 40 to 120° C., and the second stage wherein 0.0001 to 1 part by weight of a thermal polymerization initiator whose half-life period is longer than 1000 hr at 70° C. and 2 hr or longer at the polymerization initiation temperature is added and polymerization is carried out at a temperature which is higher than that of the first stage but in the range of 100 to 200° C. In the published specification, as examples of polymerization initiators used in the invention described therein, there are mentioned organic peroxides such as acetyl peroxide, lauroyl peroxide, benzoyl peroxide, diisopropyl peroxide, di-2-ethylhexyl peroxydicarbonate, tert-butyl peroxy(2-ethyl hexanoate), tert-butyl peroxylaurate and tert-butyl peroxyacetate; and azo compounds such as azobisisobutyronitrile and 2,2'-azobis(2,4-dimethylvaleronitrile).

The polymerization initiators used in the invention described in this published specification are thermal polymerization initiators, and the 10-hr half-life temperatures thereof are in the range of 43 to 102° C. Upon reviewing the thermal polymerization initiators used in the invention described in this published specification, it is noted that there is no technical idea of selectively employing a thermal polymerization initiator of specified half-life temperature and that customary thermal polymerization reaction initiators are used. Rather, the description as to polymerization initiators in the invention described in this published specification is directed to the amount of polymerization initiator used, and it is described therein that an extremely small amount of thermal polymerization initiator can be used. Even if it is intended to control the reaction temperature within the range of 40 to 120° C. with the use of the above thermal polymerization initiators, the heat generation is highly dependent on the activity of employed reaction initiator. For example, in the use of tert-butyl peroxide, benzoyl peroxide or the like as described in the Example section, the temperature of reaction system would sharply rise simultaneously with the initiation of reaction. Therefore, there would occur such a problem that, for suppressing the heat generation, a cooling unit of extremely high performance must be provided.

Still further, Japanese Patent No. 2,752,458 discloses a process for producing a methacrylic polymer, comprising the steps of charging a monomer mixture whose principal component is methyl methacrylate in a complete mixing type reactor, adjusting dissolving oxygen in the monomer mixture to 1 ppm or less, and, in the presence of a thermal polymerization initiator whose half-life period at polymerization temperature is in the range of 0.5 to 120 sec, carrying out polymerization at a temperature within the range of 130 to 160° C. under agitation by a specified agitating power with the average residence time set so that the average residence time and half-life period of radical polymerization initiator fall within specified ranges to thereby attain a monomer conversion of 45 to 70%.

Radical polymerization initiators practically used in the Example section of the published specification are, for example, 2,2-azobisisobutyronitrile, tert-butyl peroxyisobutyrate and lauroyl peroxide. The 10-hr half-life temperatures there of exceed 41° C. Therefore, for example, the Example section and FIG. 2 show the use of a cooling unit of extremely high performance for suppressing runaway reactions, for example, the use of a heat exchanger with the use of, for example, −5° C. of refrigerant as a cooling unit.

As apparent from the above, in the conventional bulk polymerization processes, there is no technical idea of selecting a polymerization initiator for use, and the technique of carrying the generated heat to the outside of the reaction system by means of a cooling unit of high performance to thereby suppress the runaway reaction has been employed. Thus, these processes have a drawback in that the cooling unit is extremely expensive. Further, in the industrial-scale production of an acrylic polymer wherein a homogeneous advance of reaction is difficult, even the use of a cooling unit of quite high performance would not resolve the extreme difficulty in uniformly cooling the entirety of reaction tank. Consequently, if a reaction runaway occurs at part of the inside of the reactor, there is the danger of extending of the runaway reaction to the whole of reaction system. Thus, even if a reaction ensures stable advance on an experimental level, a straight scale-up thereof to an industrial process might be inappropriate.

Apart from the above, the acrylic polymers which can be produced by these various polymerization processes find a variety of applications. In particular, the acrylic polymers are widely used in pressure sensitive adhesives. Such pressure sensitive adhesives have been incorporated with tackifiers whose representative examples are rhodinic acid derivatives.

For example, with respect to an acrylic pressure sensitive adhesive, (meth)acrylic polymers themselves have tackiness and, even if no tackifier is added, can provide a pressure sensitive adhesive of excellent thermal stability and weather resistance. However, this pressure sensitive adhesive is inferior to pressure sensitive adhesives incorporated with tackifiers in adherence at room temperature and adherence to a low-energy surface such as a surface of polyolefin, automobile coating or the like. Thus, the addition of a tackifier would impart advantageous adhesive properties.

However, the improvement of adhesive properties realized by the addition of a tackifier is not necessarily satisfactory. Further, the addition of a tackifier to acrylic pressure sensitive adhesives would cause the following problems. That is, the addition of common tackifiers whose representative examples are rhodinic acid derivatives to acrylic pressure sensitive adhesives would often cause deteriorations of transparency and weather resistance. Further, when such tackifiers are present at the time of bulk polymerization reaction, the tackifiers would act as a chain transfer agent or a reaction terminating agent, depending on the structure thereof, so that there is the danger of inviting the inhibition or retardation of polymerization reaction.

Also, it is known to add an acrylic polymer as a tackifier to a pressure sensitive adhesive. For example, Japanese Patent Laid-open Publication No. 54(1979)-3136 discloses a pressure sensitive adhesive containing both an acrylic polymer and a tackifier. The tackifier used therein is one obtained by a solution polymerization of a mixture of a vinyl aromatic compound and a (meth)acrylic ester, which has a number average molecular weight of 500 to 3000 and a softening point of 40° C. or below. Further, Japanese Patent Laid-open Publication No. 1(1989)-139665 discloses the invention of an adhesive composition containing a polymeric additive having a number average molecular weight of 35,000 or less and a softening point of 40° C. or above, which polymeric additive is obtained by polymerizing a (meth)acrylate having an alkyl or a cycloalkyl group of 1 to 20 carbon atoms and a free-radical compatible olefinic acid (for example, acrylic acid or the like) optionally together with another ethylenic unsaturated monomer. This published specification describes that the polymeric additive can be produced by any of the emulsion polymerization, suspension polymerization, solution polymerization and bulk polymerization. It is further described in the published specification that "This polymeric additive is added to the adhesive composition by known methods, for example, mixing and blending, and the added matter is homogeneously contained in the adhesive composition. The additive is preferably added to the adhesive composition in the form of an emulsion, or a solute emulsified in a mixture of an aqueous solvent and an organic solvent."

That is, it is described that the polymeric additive described in this published specification is produced by the emulsion polymerization or solution polymerization, and that the polymeric additive in a form emulsified or dissolved in a solvent is added to the adhesive prepared by the emulsion polymerization or solution polymerization.

A reason for the use of the polymeric additive and adhesive obtained by the emulsion polymerization or solution polymerization without exception in these published specifications would be that, although that an acrylic monomer can be polymerized without the use of a reaction solvent (bulk polymerization) has been known, it is extremely difficult, as mentioned above, to control the reaction in the polymerization of an acrylic monomer performed without the use of a reaction solvent, namely, the bulk polymerization, thereby failing to produce a polymer selectively with specified properties. Another reason would be nothing but that a homogeneous composition can be easily obtained by mixing the polymeric additive and adhesive produced by the solution polymerization or emulsion polymerization with a solvent or a dispersion medium.

However, when bonding is conducted with the use of such a pressure sensitive adhesive composition containing a solvent or an emulsion type pressure sensitive adhesive composition, an operation of removing the solvent or dispersion medium must be needed. For example, in the use of water whose latent heat of evaporation is large, a prolonged drying operation must be effected. Further, when an organic solvent is used, not only a device for trapping an evaporated organic solvent must be installed but also there occurs such a problem that the influence on environment must be apprehended.

On the other hand, processes for producing a pressure sensitive adhesive without the use of any solvent or dispersion medium are described in Japanese Patent Laid-open Publication Nos. 50(1975)-87129 and 50(1975)-102635. These published specifications disclose a process for producing a pressure sensitive adhesive tape, comprising coating a support sheet with a mixture obtained by mixing a mixture of a (meth)acrylic acid alkyl ester and a vinyl monomer having a specified polar group with a (co)polymer thereof and a polymerization initiator and subsequently carrying out thermal polymerization of the mixture on the support sheet. In the invention of Japanese Patent Laid-open Publication No. 50(1975)-87129, use is made of a redox type polymerization initiator because, with the use of common polymerization initiators, polymerization cannot smoothly advance due to the polymerization inhibiting action of oxygen. In the invention of Japanese Patent Laid-open Publication No. 50(1975)-102635, thermal polymerization reaction is carried out while avoiding the contact with oxygen by overlaying the raw material pressure sensitive adhesive composition after coating with a release sheet or belt.

As aforementioned, without the use of an organic solvent, a tape with pressure sensitive adhesive property can be produced by incorporating a (meth)acrylic acid alkyl ester as a solvent with an acrylic (co)polymer.

However, the processes disclosed in these published specifications have a drawback in that, because the monomer used as a solvent is polymerized by thermal polymerization, there is constantly the danger of reaction termination by the contact with oxygen at surface portion of the coating layer where the possibility of contact with oxygen in air is high, and that thus the uniform advance of polymerization in the direction of layer thickness is difficult. Further, the monomer used therein has a composition identical with or close to that of the (co)polymer as a solute because the monomer must dissolve the (co)polymer. Therefore, the pressure sensitive adhesive layer of the pressure sensitive adhesive tapes obtained by the processes described in these published specifications is constituted of (co)polymers of substantially the same composition.

Pressure sensitive adhesive layers constituted of such (co)polymers of substantially a single composition would not exhibit satisfactory bond strength to an adherend whose bonding is considered to be difficult, such as a polyolefin.

Apart from the above, the acrylic pressure sensitive adhesive is often used in the form of a pressure sensitive adhesive tape obtained by coating a flexible support constituted of, for example, a paper or plastic with the acrylic pressure sensitive adhesive.

With respect to the acrylic pressure sensitive adhesive for use in the above acrylic pressure sensitive adhesive tape, the viscosity thereof must be low to a certain level for enabling coating to obtain the acrylic pressure sensitive adhesive layer. Accordingly, the pressure sensitive adhesive obtained by polymerization using a solvent or dispersion medium, such as the solution polymerization or emulsion polymerization, is used as the above pressure sensitive adhesive for use in the acrylic pressure sensitive adhesive tape. That is, the pressure sensitive adhesive tape is produced by coating a support with the pressure sensitive adhesive produced by the aforementioned processes together with the solvent or dispersion medium and expelling the solvent or dispersion medium.

However, the pressure sensitive adhesive tape from the pressure sensitive adhesive obtained by the above polymerization processes has a drawback in that not only is high energy required for drying but also the pressure sensitive adhesive tape has a problem of smell attributed to residual solvent. Further, the pressure sensitive adhesive tape obtained through water-based polymerization often fails to have satisfactory water resistance. As aforementioned, the bulk polymerization is known as a polymerization method wherein neither solvent nor dispersion medium is used. However, in the bulk polymerization, not only controlling of the reaction is difficult to thereby cause it extremely difficult to obtain a pressure sensitive adhesive tape of stable properties but also the polymer obtained by the bulk polymerization generally has such a high viscosity that coating of supports is extremely difficult. Therefore, in the use of a pressure sensitive adhesive not containing any solvent or dispersion medium, for example, the hot melt technique wherein the viscosity of pressure sensitive adhesive used in coating is lowered by heating is employed. It is also known to produce a pressure sensitive adhesive tape by polymerizing a monomer applied on a support with, for example, the irradiation of ultraviolet light (see Japanese Patent Laid-open Publication Nos. 5(1993)-5014 and 9(1997)-111195).

As described with respect to this process, however, polymerization requires a prolonged period of time in a single-photopolymerization-step process, so that, in the mass production of, for example, a pressure sensitive adhesive tape, producing a pressure sensitive adhesive from a monomer by a single-photopolymerization-step process is extremely disadvantageous from the viewpoint of cost. Therefore, a pressure sensitive adhesive tape is produced through a plurality of photopolymerization steps. In the initial polymerization of such a monomer, a prepolymerization through photopolymerization reaction is generally employed because, as described above, reaction control is extremely difficult if thermal polymerization is employed in the partial polymerization of monomer.

SUMMARY OF THE INVENTION

The present invention is based on finding of a method capable of stably advancing reaction without runaway thereof in the bulk polymerization process. Thus, it is an object of the present invention to provide an acrylic pressure sensitive adhesive tape wherein use is made of a partial polymerizate obtained by the method, and to provide a process for producing such a pressure sensitive adhesive tape.

In particular, it is an object of the present invention to provide a process for stably producing an acrylic pressure sensitive adhesive tape having excellent adhesive properties, and to provide an acrylic pressure sensitive adhesive tape having excellent adhesive properties, especially properties such as thermal stability and water resistance.

It is another object of the present invention to provide a novel acrylic pressure sensitive adhesive composition which contains substantially no solvent.

It is a further object of the present invention to provide an acrylic pressure sensitive adhesive composition which enables the production of an adhesive capable of exhibiting an extremely high adherence to an adherent whose bonding is known as being extremely difficult, such as a polyolefin, and which, in the use in the formation of a pressure sensitive adhesive tape, ensures excellent applicability and curability.

It is still a further object of the present invention to provide a pressure sensitive adhesive tape wherein use is made of the above pressure sensitive adhesive composition, and to provide a process for producing the same.

The acrylic pressure sensitive adhesive composition of the present invention comprises:
- (a) 5 to 75 parts by weight of an adherent polymer comprising (meth)acrylic ester component units as principal structural units and having a weight average molecular weight of 50,000 or more,
- (b) 5 to 40 parts by weight of a tackifier resin comprising (meth)acrylic ester component units as principal structural units and having a weight average molecular weight of 20,000 or less, and
- (c) 20 to 90 parts by weight of monomers whose principal component is a (meth)acrylic ester,
- provided that the sum of component (a), component (b) and component (c) is 100 parts by weight,
- wherein substantially no solvent is contained.

The process for producing a pressure sensitive adhesive tape according to the present invention comprises coating a support surface with a mixture of 100 parts by weight of an acrylic pressure sensitive adhesive composition and 0.01 to 3 parts by weight of a polymerization initiator at a thickness of 0.01 to 1.0 mm and polymerizing the mixture,
the above acrylic pressure sensitive adhesive composition comprising:
- (a) 5 to 75 parts by weight of an adherent polymer comprising (meth)acrylic ester component units as principal structural units and having a weight average molecular weight of 50,000 or more,
- (b) 5 to 40 parts by weight of a tackifier resin comprising (meth)acrylic ester component units as principal structural units and having a weight average molecular weight of 20,000 or less, and
- (c) 20 to 90 parts by weight of monomers whose principal component is a (meth)acrylic ester,
- provided that the sum of component (a), component (b) and component (c) is 100 parts by weight,
- substantially no solvent contained in the acrylic pressure sensitive adhesive composition.

The first pressure sensitive adhesive tape of the present invention is one obtained by coating a support surface with a mixture of 100 parts by weight of an acrylic pressure sensitive adhesive composition and 0.01 to 3 parts by weight of a polymerization initiator at a thickness of 0.01 to 1.0 mm and polymerizing the mixture,
the above acrylic pressure sensitive adhesive composition comprising:
- (a) 5 to 75 parts by weight of an adherent polymer comprising (meth)acrylic ester component units as principal structural units and having a weight average molecular weight of 50,000 or more,
- (b) 5 to 40 parts by weight of a tackifier resin comprising (meth)acrylic ester component units as principal structural units and having a weight average molecular weight of 20,000 or less, and
- (c) 20 to 90 parts by weight of monomers whose principal component is a (meth)acrylic ester,
- provided that the sum of component (a), component (b) and component (c) is 100 parts by weight,
- substantially no solvent contained in the acrylic pressure sensitive adhesive composition.

The acrylic pressure sensitive adhesive composition of the present invention is characterized by comprising an adherent polymer (a) of 50,000 or more weight average molecular weight having a low glass transition temperature and having tackiness at room temperature, a tackifier resin (b) with a glass transition temperature higher than room temperature which has no tackiness at room temperature but, upon being added to a pressure sensitive adhesive composition, can impart tackiness to the pressure sensitive adhesive composition, and a monomer (c). A pressure sensitive adhesive of high bond strength can be produced by, for example, adding a polymerization initiator to the acrylic pressure sensitive adhesive composition and polymerizing the mixture. In particular, the acrylic pressure sensitive adhesive composition of the present invention, when applied to, for example, a polyolefin whose bonding is considered to be difficult because of low affinity to pressure sensitive adhesives, it exhibits excellent pressure sensitive adhesive property.

A pressure sensitive adhesive tape can be produced by coating a support surface with the acrylic pressure sensitive adhesive composition of the present invention and polymerizing the acrylic pressure sensitive adhesive composition on the support. This acrylic pressure sensitive adhesive composition contains a tackifier resin of high glass transition temperature and low molecular weight. The addition of this tackifier resin causes the obtained pressure sensitive adhesive tape to have a peel strength greater than those of conventional pressure sensitive adhesive tapes. Further, this acrylic pressure sensitive adhesive composition does not contain any solvent, so that not only it is not needed to expel a solvent in the production of pressure sensitive adhesive tape to thereby enable producing a pressure sensitive adhesive tape with reduced operation but also environmental pollution by solvents can be avoided.

The second acrylic pressure sensitive adhesive tape of the present invention comprises a support and, superimposed on at least one surface thereof, a pressure sensitive adhesive layer, the above pressure sensitive adhesive layer formed by coating the support surface with a pressure sensitive adhesive composition and photopolymerizing the pressure sensitive adhesive composition, the above pressure sensitive adhesive composition comprising:

a partial polymerizate of monomers each having a polymerizable unsaturated bond whose principal component is an acrylic acid alkyl ester, the above partial polymerizate containing polymers of the monomers in an amount of 5% by weight or more, a crosslinking agent, and a photopolymerization initiator.

The process for producing the second acrylic pressure sensitive adhesive tape according to the present invention comprises coating at least one surface of a support with a pressure sensitive adhesive composition so as to form a coating layer and irradiating the coating layer with light so that the pressure sensitive adhesive composition is photopolymerized to thereby obtain the pressure sensitive adhesive layer superimposed on the support surface, the above pressure sensitive adhesive composition comprising:

a partial polymerizate of monomers each having a polymerizable unsaturated bond whose principal component is an acrylic acid alkyl ester, the above partial polymerizate containing polymers of the monomers in an amount of 5% by weight or more, a crosslinking agent, and a photopolymerization initiator.

The above second acrylic pressure sensitive adhesive tape of the present invention exhibits highly excellent adhesive properties because it is produced by coating a support with a pressure sensitive adhesive comprising a specified partial polymerizate, a crosslinking agent and a photopolymerization initiator and photopolymerizing the pressure sensitive adhesive. In particular, a pressure sensitive adhesive tape of excellent thermal stability can be obtained by the use of a partial polymerizate prepared with the use of a specified thermal polymerization initiator.

DETAILED DESCRIPTION OF THE INVENTION

The acrylic pressure sensitive adhesive composition, first pressure sensitive adhesive tape, second acrylic pressure sensitive adhesive tape and process for producing these according to the present invention will be described in detail below.

First, the acrylic pressure sensitive adhesive composition of the present invention will be described.

The acrylic pressure sensitive adhesive composition of the present invention comprises:

(a) an adherent polymer of high molecular weight, (b) a tackifier resin of low molecular weight, and (c) a monomer.

The adherent polymer of high molecular weight (a) as a constituent of the acrylic pressure sensitive adhesive composition of the present invention is an adherent polymer comprising (meth)acrylic ester component units as principal structural units and having a weight average molecular weight of 50,000 or more.

The adherent polymer (a) has tackiness at room temperature, and the glass transition temperature of the adherent polymer (a) is generally 0° C. or below, preferably in the range of 0 to −85° C. By virtue of the adherent polymer (a) having such a glass transition temperature, the pressure sensitive adhesive obtained from the composition of the present invention has fundamental tackiness. The weight average molecular weight of the adherent polymer (a) is 50,000 or more, preferably in the range of 100,000 to 2,000,000. When the weight average molecular weight of the adherent polymer (a) is less than 50,000, the pressure sensitive adhesive obtained from the composition of the present invention cannot exhibit satisfactory tackiness performance. In the present invention, the weight average molecular weight is a value determined by gel permeation chromatography (GPC).

The adherent polymer of high molecular weight (a) is produced by polymerizing monomers each having a polymerizable unsaturated bond whose principal component is a (meth)acrylic ester.

In the present invention, as such a (meth)acrylic ester, use can be made of an ester from (meth)acrylic acid and an alcohol having an alkyl group of 1 to 20 carbon atoms, or an ester from (meth)acrylic acid and an alicyclic alcohol having 3 to 14 carbon atoms, or an ester from (meth)acrylic acid and an aromatic alcohol having 6 to 14 carbon atoms.

The above (meth)acrylic ester can be, for example, any of:

(meth)acrylic acid alkyl esters, such as methyl (meth)acrylate, ethyl (meth)acrylate, propyl (meth)acrylate, butyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate and dodecyl (meth)acrylate;

esters from (meth)acrylic acid and an alicyclic alcohol, such as cyclohexyl (meth)acrylate; and (meth)acrylic acid aryl esters, such as phenyl (meth)acrylate and benzyl (meth)acrylate. These (meth)acrylic esters can be used individually or in combination.

The adherent polymer of high molecular weight (a) for use in the present invention is prepared by using the above (meth)acrylic ester as a principal component for serving as the monomer having a polymerizable unsaturated bond. Therefore, the adherent polymer of high molecular weight (a) for use in the present invention contains repeating units derived from the above (meth)acrylic ester ((meth)acrylic ester component units) in an amount, in terms of monomer, of 50% by weight or more, preferably 70% by weight or more, and still preferably 90% by weight or more.

The adherent polymer of high molecular weight (a) for use in the present invention may comprise not only the above (meth)acrylic ester component units but also repeating units derived from a monomer which is copolymerizable with the (meth)acrylic ester.

This monomer which is copolymerizable with the (meth)acrylic ester can be, for example, any of:

(meth)acrylic acid;

alkoxyalkyl (meth)acrylates, such as methoxyethyl (meth)acrylate, ethoxyethyl (meth)acrylate, propoxyethyl (meth)acrylate, butoxyethyl (meth)acrylate and ethoxypropyl (meth)acrylate;

salts, such as alkali metal salts of (meth)acrylic acid;

di(meth)acrylic acid esters of (poly)alkylene glycol, such as di(meth)acrylic acid ester of ethylene glycol, di(meth)acrylic acid ester of diethylene glycol, di(meth)acrylic acid ester of triethylene glycol, di(meth)acrylic acid ester of polyethylene glycol, di(meth)acrylic acid ester of propylene glycol, di(meth)acrylic acid ester of dipropylene glycol and di(meth)acrylic acid ester of tripropylene glycol;

poly(meth)acrylic acid esters, such as tri(meth)acrylic acid ester of trimethylolpropane;

(meth)acrylonitrile; vinyl acetate; vinylidene chloride;

halogenated vinyl compounds, such as 2-chloroethyl (meth)acrylate;

polymerizable compounds having an oxazoline group, such as 2-vinyl-2-oxazoline, 2-vinyl-5-methyl-2-oxazoline and 2-isopropenyl-2-oxazoline;

polymerizable compounds having an aziridine group, such as (meth)acryloylaziridine and 2-aziridinylethyl (meth)acrylate;

vinyl monomers having an epoxy group, such as allyl glycidyl ether, (meth)acryloyl glycidyl ether and (meth)acryloyl 2-ethylglycidyl ether;

vinyl compounds having a hydroxyl group, such as 2-hydroxyethyl (meth)acrylate, 2-hydroxypropyl acrylate, amonoester from (meth)acrylic acid and polypropylene glycol or polyethylene glycol and an adduct of a lactone and 2-hydroxyethyl (meth)acrylate;

fluorinated vinyl monomers, such as fluorinated methacrylic acid alkyl esters and fluorinated acrylic acid alkyl esters;

unsaturated carboxylic acids (excluding (meth)acrylic acid), such as itaconic acid, crotonic acid, maleic acid and fumaric acid, salts thereof, and (partial) ester compounds and acid anhydrides from these acids;

reactive halogenated vinyl monomers, such as 2-chloroethyl vinyl ether and vinyl monochloroacetate;

vinyl monomers having an amide group, such as methacrylamide, N-methylolmethacrylamide, N-methoxyethylmethacrylamide and N-butoxymethylmethacrylamide;

vinyl monomers having an organosilicon group, such as vinyltrimethoxysilane, γ-methacryloxypropyltrimethoxysilane, allyltrimethoxysilane, trimethoxysilylpropylallylamine and 2-methoxyethoxytrimethoxysilane; and aromatic compounds having a vinyl group, such as styrene and methylstyrene; and macromonomers having a radical-polymerizable vinyl group at a molecular terminal (e.g., fluorinated macromonomer and silicon-containing macromonomer). These monomers can be used individually or in combination to effect copolymerization with the above (meth)acrylic ester.

The adherent polymer of high molecular weight (a) for use in the present invention can be, for example, a copolymer of butyl acrylate/2-ethylhexyl acrylate/acrylic acid/2-hydroxyethyl acrylate, or a copolymer of 2-ethylhexyl acrylate/acrylic acid/2-hydroxyethyl acrylate.

The tackifier resin of low molecular weight (b) as a constituent of the acrylic pressure sensitive adhesive composition of the present invention has not tackiness and is solid at room temperature. The glass transition temperature of the tackifier resin of low molecular weight (b) is generally 40° C. or above, preferably in the range of 40 to 180° C. The addition of the tackifier resin of low molecular weight (b) strikingly enhances the pressure sensitive adhesive performance of the first pressure sensitive adhesive tape of the present invention. The weight average molecular weight of the tackifier resin of low molecular weight (b) is 20,000 or less, preferably 10,000 or less, and still preferably in the range of 10,000 to 2000. When the weight average molecular weight of the tackifier resin of low molecular weight (b) exceeds 20,000, the pressure sensitive adhesive obtained from the composition of the present invention cannot satisfactorily exert an effect of enhancing the pressure sensitive adhesive performance.

The tackifier resin of low molecular weight (b) is produced by polymerizing monomers each having a polymerizable unsaturated bond whose principal component is a (meth)acrylic ester.

In the present invention, as such a (meth)acrylic ester, use can be made of a (meth)acrylic acid alkyl ester from (meth)acrylic acid and an alcohol having an alkyl group of 1 to 20, preferably 1 to 4 carbon atoms, or an ester from (meth)acrylic acid and an alicyclic alcohol having 3 to 14 carbon atoms, or an ester from (meth)acrylic acid and an aromatic alcohol having 6 to 14 carbon atoms.

The above (meth)acrylic ester can be, for example, any of:

(meth)acrylic acid alkyl esters, such as methyl (meth)acrylate, ethyl (meth)acrylate, propyl (meth)acrylate, butyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate and dodecyl (meth)acrylate;

esters from (meth)acrylic acid and an alicyclic alcohol, such as cyclohexyl (meth)acrylate; and (meth)acrylic acid aryl esters, such as phenyl (meth)acrylate and benzyl (meth)acrylate. These (meth)acrylic esters can be used individually or in combination. Among these (meth)acrylic esters, a (meth)acrylic acid alkyl ester having an alkyl group of 1 to 4 carbon atoms, and/or an ester from an alicyclic alcohol having 3 to 14 carbon atoms and (meth)acrylic acid, and/or an ester of benzyl alcohol is preferably used in the present invention.

The tackifier resin of low molecular weight (b) for use in the present invention is prepared by using the above (meth)acrylic ester as a principal component for serving as the monomer having a polymerizable unsaturated bond. Therefore, the tackifier resin of low molecular weight (b) for use in the present invention contains repeating units derived from the above (meth)acrylic ester ((meth)acrylic ester component units) in an amount, in terms of monomer, of 50% by weight or more, preferably 70% by weight or more, and still preferably 90% by weight or more.

The tackifier resin of low molecular weight (b) for use in the present invention may comprise not only the above (meth)acrylic ester component units but also repeating units derived from a monomer which is copolymerizable with the (meth)acrylic ester.

This monomer which is copolymerizable with the (meth)acrylic ester can be, for example, any of:

(meth)acrylic acid;

alkoxyalkyl (meth)acrylates, such as methoxyethyl (meth)acrylate, ethoxyethyl (meth)acrylate, propoxyethyl (meth)acrylate, butoxyethyl (meth)acrylate and ethoxypropyl (meth)acrylate;

salts, such as alkali metal salts of (meth)acrylic acid;

di(meth)acrylic acid esters of (poly)alkylene glycol, such as di(meth)acrylic acid ester of ethylene glycol, di(meth)acrylic acid ester of diethylene glycol, di(meth)acrylic acid ester of triethylene glycol, di(meth)acrylic acid ester of polyethylene glycol, di(meth)acrylic acid ester of propylene glycol, di(meth)acrylic acid ester of dipropylene glycol and di(meth)acrylic acid ester of tripropylene glycol;

poly(meth)acrylic acid esters, such as tri(meth)acrylic acid ester of trimethylolpropane;

(meth)acrylonitrile; vinyl acetate; vinylidene chloride;

halogenated vinyl compounds, such as 2-chloroethyl (meth)acrylate;

polymerizable compounds having an oxazoline group, such as 2-vinyl-2-oxazoline, 2-vinyl-5-methyl-2-oxazoline and 2-isopropenyl-2-oxazoline;

polymerizable compounds having an aziridine group, such as (meth)acryloylaziridine and 2-aziridinylethyl (meth)acrylate;

vinyl monomers having an epoxy group, such as allyl glycidyl ether, (meth)acryloyl glycidyl ether and (meth)acryloyl 2-ethylglycidyl ether;

vinyl compounds having a hydroxyl group, such as 2-hydroxyethyl (meth)acrylate, 2-hydroxypropyl acrylate, a monoester from (meth)acrylic acid and polypropylene glycol or polyethylene glycol and an adduct of a lactone and 2-hydroxyethyl (meth)acrylate;

fluorinated vinyl monomers, such as fluorinated methacrylic acid alkyl esters and fluorinated acrylic acid alkyl esters;

unsaturated carboxylic acids (excluding (meth)acrylic acid), such as itaconic acid, crotonic acid, maleic acid and fumaric acid, salts thereof, and (partial) ester compounds and acid anhydrides from these acids;

reactive halogenated vinyl monomers, such as 2-chloroethyl vinyl ether and vinyl monochloroacetate;

vinyl monomers having an amido group, such as methacrylamide, N-methylolmethacrylamide, N-methoxyethylmethacrylamide and N-butoxymethylmethacrylamide;

vinyl monomers having an organosilicon group, such as vinyltrimethoxysilane, γ-methacryloxypropyltrimethoxysilane, allyltrimethoxysilane, trimethoxysilylpropylallylamine and 2-methoxyethoxytrimethoxysilane; and aromatic compounds having a vinyl group, such as styrene and methylstyrene; and macromonomers having a radical-polymerizable vinyl group at a molecular terminal (e.g., fluorinated macromonomer and silicon-containing macromonomer). These monomers can be used individually or in combination to effect copolymerization with the above (meth)acrylic ester.

It is preferred that a functional group which is reactive with an epoxy group or an isocyanate group be introduced in the tackifier resin of low molecular weight (b). The functional group can be, for example, a hydroxyl group, a carboxyl group, an amino group, an amide group or a mercapto group. It is preferred that a monomer having the above functional group be used in the production of tackifier resin of low molecular weight (b). Generally, this tackifier resin of low molecular weight (b) has a composition which is different from that of the above adherent polymer of high molecular weight (a). Also, the monomer for constituting this tackifier resin of low molecular weight (b) has a composition which is different from that of the monomer as component (c). However, this tackifier resin of low molecular weight (b) and the monomer as component (c) have a common unit of (meth)acrylic ester, so that the tackifier resin of low molecular weight (b) exhibits high solubility in the monomer as component (c).

As an appropriate example of the tackifier resin of low molecular weight (b) for use in the present invention, there can be mentioned a copolymer of isobutyl methacrylate and methacrylic acid.

The acrylic pressure sensitive adhesive composition of the present invention contains not only the above adherent polymer of high molecular weight (a) and tackifier resin of low molecular weight (b) but also monomers (c) whose principal component is a (meth)acrylic ester.

The monomers (c) whose principal component is a (meth)acrylic ester as a constituent of the acrylic pressure sensitive adhesive composition of the present invention dissolve or disperse the above adherent polymer of high molecular weight (a) and tackifier resin of low molecular weight (b), and themselves copolymerize to thereby contribute to formation of the pressure sensitive adhesive.

The above monomers (c) whose principal component is a (meth)acrylic ester can be, for example, any of:

(meth)acrylic acid alkyl esters, such as methyl (meth)acrylate, ethyl (meth)acrylate, propyl (meth)acrylate, butyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate and dodecyl (meth)acrylate;

esters from (meth)acrylic acid and an alicyclic alcohol, such as cyclohexyl (meth)acrylate; and (meth)acrylic acid aryl esters, such as phenyl (meth)acrylate and benzyl (meth)acrylate. These (meth)acrylic esters can be used individually or in combination.

The monomers (c) whose principal component is a (meth)acrylic ester for use in the present invention, although comprising the above (meth)acrylic ester as a principal component, may further contain another monomer. The other monomer which can be used in the present invention can be, for example, any of:

(meth)acrylic acid;

alkoxyalkyl (meth)acrylates, such as methoxyethyl (meth)acrylate, ethoxyethyl (meth)acrylate, propoxyethyl (meth)acrylate, butoxyethyl (meth)acrylate and ethoxypropyl (meth)acrylate;

salts, such as alkali metal salts of (meth)acrylic acid;

di(meth)acrylic acid esters of (poly)alkylene glycol, such as di(meth)acrylic acid ester of ethylene glycol, di(meth)acrylic acid ester of diethylene glycol, di(meth)acrylic acid ester of triethylene glycol, di(meth)acrylic acid ester of polyethylene glycol, di(meth)acrylic acid ester of propylene glycol, di(meth)acrylic acid ester of dipropylene glycol and di(meth)acrylic acid ester of tripropylene glycol;

poly(meth)acrylic acid esters, such as tri(meth)acrylic acid ester of trimethylolpropane;

(meth)acrylonitrile; vinyl acetate; vinylidene chloride;

halogenated vinyl compounds, such as 2-chloroethyl (meth)acrylate;

(meth)acrylic acid esters of alicyclic alcohol, such as cyclohexyl (meth)acrylate;

polymerizable compounds having an oxazoline group, such as 2-vinyl-2-oxazoline, 2-vinyl-5-methyl-2-oxazoline and 2-isopropenyl-2-oxazoline;

polymerizable compounds having an aziridine group, such as (meth)acryloylaziridine and 2-aziridinylethyl (meth)acrylate;

vinyl monomers having an epoxy group, such as allyl glycidyl ether, (meth)acryloyl glycidyl ether and (meth)acryloyl 2-ethylglycidyl ether;

vinyl compounds having a hydroxyl group, such as 2-hydroxyethyl (meth)acrylate, 2-hydroxypropyl acrylate, a monoester from (meth)acrylic acid and polypropylene glycol or polyethylene glycol and an adduct of a lactone and 2-hydroxyethyl (meth)acrylate;

fluorinated vinyl monomers, such as fluorinated methacrylic acid alkyl esters and fluorinated acrylic acid alkyl esters;

unsaturated carboxylic acids (excluding (meth)acrylic acid), such as itaconic acid, crotonic acid, maleic acid and fumaric acid, salts thereof, and (partial) ester compounds and acid anhydrides from these acids;

reactive halogenated vinyl monomers, such as 2-chloroethyl vinyl ether and vinyl monochloroacetate;

vinyl monomers having an amide group, such as methacrylamide, N-methylolmethacrylamide, N-methoxyethylmethacrylamide and N-butoxymethylmethacrylamide;

vinyl monomers having an organosilicon group, such as vinyltrimethoxysilane, γ-methacryloxypropyltrimethoxysilane, allyltrimethoxysilane, trimethoxysilylpropylallylamine and 2-methoxyethoxytrimethoxysilane; and aromatic compounds having a vinyl group, such as styrene and methylstyrene; and macromonomers having a radical-polymerizable vinyl group at a molecular terminal (e.g., fluorinated macromonomer and silicon-containing macromonomer). These monomers can be used individually or in combination to effect copolymerization with the above (meth)acrylic ester.

In the present invention, the monomers (c) comprise a (meth)acrylic ester as a principal component. Therefore, the (meth)acrylic ester is contained in a proportion of 50% by weight or more, preferably 70% by weight or more, and still preferably 90% by weight or more.

The acrylic pressure sensitive adhesive composition of the present invention comprises 5 to 75 parts by weight, preferably 5 to 50 parts by weight, of adherent polymer of high molecular weight (a), 5 to 40 parts by weight, preferably 5 to 35 parts by weight, of tackifier resin of low molecular weight (b) and 20 to 90 parts by weight, preferably 30 to 90 parts by weight, of monomers (c). Provided that, in the present invention, the sum of component (a), component (b) and component (c) is 100 parts by weight.

In the acrylic pressure sensitive adhesive composition of the above formulation according to the present invention, the component (a) and the component (b) are dissolved or dispersed in the monomers as the component (c), and any so-called solvent (solvent with no reactivity) is substantially not contained. The acrylic pressure sensitive adhesive composition of the above formulation according to the present invention is a viscous liquid which, when the viscosity thereof is measured at 25° C., generally exhibits a viscosity of 1 to 100 Pa·S, preferably 3 to 50 Pa·S. The liquid of this viscosity can be applied onto a support by the use of customary coating apparatuses.

The acrylic pressure sensitive adhesive composition of the present invention, although can be prepared by separately producing the components (a) and (b), mixing them and adding the component (c) to the mixture, is preferably prepared by performing a partial polymerization of the monomer for forming the component (a) to thereby obtain a mixture of components (a) and (c), adding separately produced component (b) to the mixture and mixing them.

The partial polymerizate obtained by polymerizing, through bulk polymerization, the monomers each having a polymerizable unsaturated bond whose principal component is an acrylic alkyl ester is a viscous liquid containing the components (a) and (c), wherein substantially no solvent is contained.

Although the tackifier resin of low molecular weight (b) for use in the present invention can be produced by various processes, it is preferred to employ a tackifier resin obtained by further polymerizing the partial polymerizate to a degree of polymerization of substantially 100%. This tackifier resin of low molecular weight (b) also does not contain any solvent. In the production of the tackifier resin of low molecular weight (b) according to the above process, the method of controlling the weight average molecular weight thereof so as to fall within the range specified in the present invention can be provided by regulating the amount of polymerization initiator, or employing a high reaction temperature, or by using a chain transfer agent in an amount greater than the usual.

The acrylic pressure sensitive adhesive composition of the present invention comprises the above component (a) component (b) and component (c). The acrylic pressure sensitive adhesive composition can be polymerized by, for example, irradiating the same with electron beams.

The acrylic pressure sensitive adhesive composition of the present invention exhibits excellent tackiness when the contained monomers are polymerized. Therefore, it is preferred that a polymerization initiator be added to the acrylic pressure sensitive adhesive composition. A thermal polymerization initiator or a photopolymerization initiator can be used as the polymerization initiator. In particular, the pressure sensitive adhesive is preferably formed by coating a support surface with the acrylic pressure sensitive adhesive composition of the present invention and exposing the same to energy radiation such as ultraviolet light. Accordingly, it is preferred that a photopolymerization initiator be added to the acrylic pressure sensitive adhesive composition of the present invention.

The photopolymerization initiator is generally added in an amount of 0.01 to 3 parts by weight, preferably 0.05 to 2 parts by weight, per 100 parts by weight of the sum of the above component (a), component (b) and component (c).

The photopolymerization initiator for use in the present invention can be a light-induced radical polymerization initiator and/or a light-induced cationic polymerization initiator, which can be, for example, any of acetophenone photopolymerization initiators such as 4-(2-hydroxyethoxy) phenyl (2-hydroxy-2-propyl)ketone [e.g., trade name: Darocur 2959, produced by Ciba-Geigy], α-hydroxy-α,α'-dimethylacetophenone [e.g., trade name: Darocure 1173, produced by Ciba-Geigy], methoxyacetophenone, 2,2-dimethoxy-2-phenylacetone [e.g., trade name: Irgacure 651, produced by Ciba-Geigy] and 2-hydroxy-2-cyclohexylacetophenone [e.g., trade name: Irgacure 184, produced by Ciba-Geigy]; ketal photopolymerization initiators such as benzyldimethylketal; and other photopolymerization initiators such as a halogenated ketone, an acylphosphine oxide and an acyl phosphonate.

It is preferred that a crosslinking agent be added to the acrylic pressure sensitive adhesive composition of the present invention.

The crosslinking agent for use in the present invention is a compound which can cause units formed by polymerization of the component (a), component (b) and component (c) to create a crosslinked structure.

This crosslinking agent is generally added in an amount of 0.01 to 5 parts by weight, preferably 0.01 to 3 parts by weight, per 100 parts by weight of the sum of the above component (a), component (b) and component (c).

As this crosslinking agent, there can be mentioned, for example, a compound having an epoxy group or a compound having an isocyanate group. For example, the compound having an epoxy group can be bisphenol A, an epoxy resin of epichlorohydrin type, ethylene glycidyl ether, polyethylene glycol diglycidyl ether, glycerol diglycidyl ether, glycerol triglycidyl ether, 1,6-hexanediol glycidyl ether, trimethylolpropane triglycidyl ether, diglycidylaniline, diaminoglycidylamine, N,N,N',N'-tetraglycidyl-m-xylylenediamine or 1,3-bis(N,N'-diaminoglycidylaminomethyl)cyclohexane. The isocyanate compound can be, for example, tolylene diisocyanate, hexamethylene diisocyanate, isophorone diisocyanate, xylylenediisocyanate, hydrogenatedxylylene diisocyanate, diphenylmethane diisocyanate, hydrogenated diphenylmethane diisocyanate, tetramethylxylylene diisocyanate, naphthalene diisocyanate, triphenylmethane triisocyanate, polymethylenepolyphenyl isocyanate or an adduct of a polyol such as trimethylolpropane and any of these isocyanates.

When the above polymerization initiator and crosslinking agent are added, it is preferred that these also substantially do not contain any solvent.

The acrylic pressure sensitive adhesive composition of the present invention may further be incorporated with a filler selected from among inorganic substances such as calcium carbonate, aluminum hydroxide, silica, clay, talc and titanium oxide, inorganic hollow substances such as glass balloons, shirasu balloons and ceramic balloons, organic substances such as nylon beads, acrylic beads and silicone beads, and organic hollow substances such as polyvinylidene chloride balloons and acrylic balloons. Still further, the acrylic pressure sensitive adhesive composition may be incorporated with a foaming agent, a dye, a pigment, a polymerization inhibitor, a stabilizer and additives commonly incorporated in pressure sensitive adhesives.

The first pressure sensitive adhesive tape of the present invention will now be described.

The first pressure sensitive adhesive tape of the present invention can be produced by coating a support surface with the above acrylic pressure sensitive adhesive composition of the present invention and polymerizing the acrylic pressure sensitive adhesive composition so as to obtain a pressure sensitive adhesive of excellent stickiness.

The support used herein can be, for example, a polyolefin film, a polyester film, paper, a metal foil, a cloth, a nonwoven fabric, a polyester film treated with silicone or a paper treated with silicone.

Surface of this support is coated with the acrylic pressure sensitive adhesive composition of the present invention. The coating thickness of this acrylic pressure sensitive adhesive composition is in the range of 0.01 to 1.0 mm.

A pressure sensitive adhesive layer can be formed by polymerizing the acrylic pressure sensitive adhesive composition superimposed on the support surface by coating. The method of forming the pressure sensitive adhesive layer is varied depending on the type of polymerization initiator added to the acrylic pressure sensitive adhesive composition. That is, for example, when a thermal polymerization initiator has been added to the acrylic pressure sensitive adhesive composition, the pressure sensitive adhesive layer is formed by heating the acrylic pressure sensitive adhesive composition superimposed by coating. When a photopolymerization initiator has been added to the acrylic pressure sensitive adhesive composition, the pressure sensitive adhesive layer is formed by irradiating the acrylic pressure sensitive adhesive composition superimposed by coating with energy radiation such as ultraviolet light to thereby advance polymerization reaction. It is especially preferred in the present invention to coat a support surface with the acrylic pressure sensitive adhesive composition incorporated with a radical photopolymerization initiator to thereby provide a coating layer and thereafter irradiating the coating layer with ultraviolet light to thereby effect polymerization. The duration of ultraviolet irradiation, although depending on the thickness of coating layer, is generally in the range of 10 sec to 5 min, preferably 30 sec to 3 min.

The component (c) contained in the coating layer is polymerized by, for example, the above irradiation of the coating layer with ultraviolet light. When the crosslinking agent is contained, further a crosslinked structure is formed. Generally, substantially the whole amount of contained component (c) is polymerized by the above irradiation of the coating layer with ultraviolet light or the like. Therefore, substantially no monomer is contained in the pressure sensitive adhesive layer.

As a result of this polymerization, the adherent polymer of high molecular weight (a) and the tackifier resin of low molecular weight (b) with their original forms maintained substantially completely are contained in the component resulting from (co)polymerization of the monomers as the component (c) in the pressure sensitive adhesive layer of the first pressure sensitive adhesive tape of the present invention. Therefore, the component (a), component (b) and (co)polymer from component (c), while maintaining their individual excellent properties, cooperate together to thereby realize characteristics which cannot be exerted by each of the individual components alone. A distinguished effect exerted by the pressure sensitive adhesive obtained from the composition of the present invention is to exhibit an excellent bond strength to an adherend whose bonding has been difficult, for example, a polyolefin such as polypropylene. Specifically, a polyolefin exhibits a low affinity to adhesives. When a polyolefin and another adherend are bonded to each other through an adhesive layer, generally the bond strength is the lowest at an interface of the adhesive layer and the polyolefin. This is one of the most apparent differences between polyolefins and other synthetic resins. However, the adhesive from the acrylic pressure sensitive adhesive composition of the present invention exhibits a strikingly enhanced bond strength to polyolefins by virtue of the addition of tackifier resin of low molecular weight (b) to the acrylic pressure sensitive adhesive composition. Although the tackifier resin of low molecular weight (b) has a glass transition temperature of 40° C. or above and does not exhibit tackiness at room temperature, the addition of tackifier resin of low molecular weight (b) to the acrylic pressure sensitive adhesive composition enables attaining a bond strength to polyolefin which is twice or more that exhibited when the tackifier resin of low molecular weight (b) is not added.

Therefore, the thus produced first pressure sensitive adhesive tape of the present invention exhibits an excellent adherence to a polyolefin whose strong bonding has been difficult, for example, polyethylene or polypropylene. For example, the pressure sensitive adhesive tape of the present invention generally exhibits a bond strength (180-degree peel strength) to polypropylene of 1000 g/20 mm or greater.

The second acrylic pressure sensitive adhesive tape of the present invention will be described in detail below.

The second acrylic pressure sensitive adhesive tape of the present invention is produced by coating a support surface with the pressure sensitive adhesive comprising a specified partial polymerizate, a crosslinking agent and a photopolymerization initiator and photopolymerizing the pressure sensitive adhesive on the support surface.

Monomer having a polymerizable unsaturated bond is used as the monomer in the production of partial polymerizate for use in the present invention. The monomer having a polymerizable unsaturated bond is provided by monomers whose principal component is an acrylic acid alkyl ester. As examples of the monomers having a polymerizable unsaturated bond, there can be mentioned the following compounds, namely:

acrylic acid alkyl esters, such as methyl acrylate, ethyl acrylate, propyl acrylate, butyl acrylate, pentyl acrylate, hexyl acrylate, 2-ethylhexyl acrylate, octyl acrylate, nonyl acrylate, decyl acrylate and dodecyl acrylate;

acrylic acid aryl esters, such as phenyl acrylate and benzyl acrylate;

alkoxyalkyl acrylates, such as methoxyethyl acrylate, ethoxyethyl acrylate, propoxyethyl acrylate, butoxyethyl acrylate and ethoxypropyl acrylate;

acrylic acid and salts, such as alkali metal salts of acrylic acid;

methacrylic acid and salts, such as alkali metal salts of methacrylic acid;

methacrylic acid alkyl esters, such as methyl methacrylate, ethyl methacrylate, propyl methacrylate, butyl methacrylate, pentyl methacrylate, hexyl methacrylate, 2-ethylhexyl methacrylate, octyl methacrylate, nonyl methacrylate, decyl methacrylate and dodecyl methacrylate;

methacrylic acid aryl esters, such as phenyl methacrylate and benzyl methacrylate;

alkoxyalkyl methacrylates, such as methoxyethyl methacrylate, ethoxyethyl methacrylate, propoxyethyl methacrylate, butoxyethyl methacrylate and ethoxypropyl methacrylate;

diacrylic acid esters of (poly)alkylene glycol, such as diacrylic acid ester of ethylene glycol, diacrylic acid ester of diethylene glycol, diacrylic acid ester of triethylene glycol, diacrylic acid ester of polyethylene glycol, diacrylic acid ester of propylene glycol, diacrylic acid ester of dipropylene glycol and diacrylic acid ester of tripropylene glycol;

dimethacrylic acid esters of (poly)alkylene glycol, such as dimethacrylic acid ester of ethylene glycol, dimethacrylic acid ester of diethylene glycol, dimethacrylic acid ester of triethylene glycol, dimethacrylic acid ester of polyethylene glycol, dimethacrylic acid ester of propylene glycol, dimethacrylic acid ester of dipropylene glycol and dimethacrylic acid ester of tripropylene glycol;

polyacrylic acid esters, such as triacrylic acid ester of trimethylolpropane;

polymethacrylic acid esters, such as trimethacrylic acid ester of trimethylolpropane;

acrylonitrile; methacrylonitrile; vinyl acetate; vinylidene chloride;

halogenated vinyl compounds, such as 2-chloroethyl acrylate and 2-chloroethyl methacrylate;

acrylic acid esters of alicyclic alcohol, such as cyclohexyl acrylate;

methacrylic acid esters of alicyclic alcohol, such as cyclohexyl methacrylate;

polymerizable compounds having an oxazoline group, such as 2-vinyl-2-oxazoline, 2-vinyl-5-methyl-2-oxazoline and 2-isopropenyl-2-oxazoline;

polymerizable compounds having an aziridine group, such as acryloylaziridine, methacryloylaziridine, 2-aziridinylethyl acrylate and 2-aziridinylethyl methacrylate;

vinyl monomers having an epoxy group, such as allyl glycidyl ether, acryloyl glycidyl ether, methacryloyl glycidyl ether, acryloyl 2-ethylglycidyl ether and methacryloyl 2-ethylglycidyl ether;

vinyl compounds having a hydroxyl group, such as 2-hydroxyethyl acrylate, 2-hydroxyethyl methacrylate, 2-hydroxypropyl acrylate, a monoester from acrylic acid or methacrylic acid and polypropylene glycol or polyethylene glycol and an adduct of a lactone and 2-hydroxyethyl (meth)acrylate;

fluorinated vinyl monomers, such as fluorinated methacrylic acid alkyl esters and fluorinated acrylic acid alkyl esters;

unsaturated carboxylic acids excluding (meth)acrylic acid, such as itaconic acid, crotonic acid, maleic acid and fumaric acid, salts thereof, and (partial) ester compounds and acid anhydrides from these acids;

reactive halogenated vinyl monomers, such as 2-chloroethyl vinyl ether and vinyl monochloroacetate;

vinyl monomers having an amide group, such as methacrylamide, N-methylolmethacrylamide, N-methoxyethylmethacrylamide and N-butoxymethylmethacrylamide;

vinyl monomers having an organosilicon group, such as vinyltrimethoxysilane, γ-methacryloxypropyltrimethoxysilane, allyltrimethoxysilane, trimethoxysilylpropylallylamine and 2-methoxyethoxytrimethoxysilane; and aromatic compounds having a vinyl group, such as styrene and methylstyrene; and macromonomers having a radical-polymerizable vinyl group at a molecular terminal (e.g., fluorinated macromonomer and silicon-containing macromonomer).

These polymerizable unsaturated compounds can be used individually or in combination. The composition of polymerizable unsaturated compounds is so constituted that the glass transition temperature thereof according to the Fox formula is generally 0° C. or below, preferably in the range of −85 to 0° C.

Among the above compounds, even monomers which exhibit such a high reaction rate that the bulk polymerization thereof has been difficult can be stably bulk-polymerized by employing the process of the present invention. The partial polymerization reaction employed in the present invention can be effectively utilized even for a combination of monomers of high reaction rate, for example, a mixture of 2-ethylhexyl acrylate and acrylic acid. Although the content of acrylic acid alkyl ester in the monomers having a polymerizable unsaturated bond for use in this bulk polymerization process is not particularly limited, it is most appropriate in the present invention to subject monomers containing an acrylic acid alkyl ester in an amount of 0.1 to 100 parts by weight, preferably 1 to 100 parts by weight, per 100 parts by weight of all the monomers to bulk polymerization.

In the bulk polymerization for producing the partial polymerizate for use in the present invention, the above monomers having a polymerizable unsaturated bond care reacted substantially without the use of reaction solvents.

In the bulk polymerization, it is preferred to polymerize the monomers having a polymerizable unsaturated bond in the presence of any of the following specified polymerization initiators.

Polymerization initiators having a 10-hr half-life temperature of 41.0° C. or below, especially in the range of 20 to 37.0° C., whose examples are given below are preferably used in this bulk polymerization.

Examples of suitable polymerization initiators include:
isobutyryl peroxide (10-hr half-life temperature: 32.7° C.), α,α'-bis(neodecanoylperoxy)diisopropylbenzene (10-hr half-life temperature: 35.9° C.), cumyl peroxyneodecanoate (10-hr half-life temperature: 36.5° C.), di-n-propyl peroxydicarbonate (10-hr half-life temperature: 40.3° C.), diisopropyl peroxydicarbonate (10-hr half-life temperature: 40.5° C.), di-sec-butyl peroxydicarbonate (10-hr half-life temperature: 40.5° C.), 1,1,3,3-tetramethylbutyl peroxyneodecanoate (10-hr half-life temperature: 40.7° C.), bis(4-butylcyclohexyl) peroxydicarbonate (10-hr half-life temperature: 40.8° C.), and 2,2'-azobis(4-methoxy-2,4-dimethylvaleronitrile) (10-hr half-life temperature: 30.0° C.).

These polymerization initiators can be used individually or in combination.

Among these polymerization initiators, preferred use is made of:

isobutyryl peroxide (10-hr half-life temperature: 32.7° C.),

α,α'-bis(neodecanoylperoxy)diisopropylbenzene (10-hr half-life temperature: 35.9° C.), cumyl peroxyneodecanoate (10-hr half-life temperature: 36.5° C.), and 2,2'-azobis(4-methoxy-2,4-dimethylvaleronitrile) (10-hr half-life temperature: 30.0° C.). Using 2,2'-azobis(4-methoxy-2,4-dimethylvaleronitrile) (10-hr half-life temperature: 30.0° C.) is especially preferred.

These polymerization initiators are thermal polymerization initiators and are characterized by having extremely low 10-hr half-life temperatures. For example, the 10-hr half-life temperatures of commonly used polymerization initiator, i.e., tert-butyl peroxyisobutyrate, benzoyl peroxide and 2,2'-azobisisobutyronitrile are 72.1° C., 74° C. and 66° C., respectively. When use is made of these thermal polymerization initiators of high 10-hr half-life temperatures, in the bulk polymerization reaction, the reaction is extremely rapidly advanced immediately upon the initiation of reaction to thereby render controlling of reaction extremely difficult.

In the production of the partial polymerizate for use in the second acrylic pressure sensitive adhesive tape of the present invention, the polymerization reaction is advanced in the presence of a small amount of thermal polymerization initiator of extremely low 10-hr half-life temperature in place of the above thermal polymerization initiators of high 10-hr half-life temperature.

That is, in the present invention, the polymerization initiator of low 10-hr half-life temperature is used in an amount of 0.0001 to 0.5 part by weight, preferably 0.0005 to 0.1 part by weight, and still preferably 0.001 to 0.05 part by weight, per 100 parts by weight of monomers having a polymerizable unsaturated group. These amounts of polymerization initiator used is extremely small as compared with the usage of reaction initiator in, for example, customary bulk polymerization, and the amount of monomers reacted by the polymerization initiator is small. Accordingly, the heat of polymerization is relatively small. However, generally, an operation of heating the reaction system from outside is not carried out once the reaction is initiated by heating the reaction system at an initial stage. Once the reaction is initiated, heat is generated in this reaction system by the consumption of the polymerization initiator. However, in the present invention, the amount of polymerization initiator used is small, so that the amount of heat generation is small to thereby enable avoiding such a sharp increase of the temperature of reaction system as to cause runaway of reaction. Moreover, the polymerization initiator of low 10-hr half-life temperature is employed, so that the polymerization initiator is consumed within an extremely short period of time. Thus, once the polymerization initiator is completely consumed as a result of a sharp increase of reactant temperature, there would be no further increase of reactant temperature. However, when the amount of polymerization initiator is far smaller than the above lower limit, the polymerization initiator would be consumed by a polymerization inhibitor generally added to prevent the advance of reaction of monomers as raw materials during, for example, the storage thereof, so that effective advance of polymerization reaction would be hindered.

After the initiation of reaction, the maximum temperature of reactants is caused to increase so as to fall within the range of 100 to 140° C., preferably 100 to 130° C., by the use of self-exothermic property of reaction system exerted by the consumption of polymerization initiator, but is caused not to exceed the upper limit of the temperature range. Generally, after heating for the initiation of polymerization reaction, the heating or warming operation is terminated, and the temperature of reaction system is caused to increase so as to fall within the range of 100 to 140° C., preferably 100 to below 130° C., by the use of self-exothermic property exerted in accordance with the advance of polymerization reaction.

When the temperature of reaction system exceeds 140° C., the runaway of reaction by thermal polymerization would begin and it would be difficult to control the thermal runaway reaction. On the other hand, when the maximum temperature is lower than 100° C., there would occur such a problem that the polymerization cannot be advanced to a desirable polymerization degree by the bulk polymerization reaction to thereby cause the polymerization initiator to remain in the reaction system with the result that the polymerization is further advanced during the storage of reaction product. When the scale of reaction is large, especially in the production of such a plant level that the amount of reaction raw materials exceeds 1000 kg, it would be substantially difficult to stop the runaway of reaction by customary cooling apparatuses upon the increase of reaction system temperature to, for example, about 150° C. At that time, stopping the runaway reaction would be difficult unless, for example, a method of loading a large amount of polymerization inhibitor is employed. Further, when the reaction temperature exceeds 180° C., it would be impossible to stop the runaway reaction. That is, when use is made of any of commonly employed polymerization initiators of high 10-hr half-life temperature, the polymerization initiator would not be completely consumed at 100 to 140° C., and the temperature of reaction system would increase to thereby cause further advance of thermal polymerization, consequently causing further temperature increase of reaction system. Thus, finally, controlling the reaction would be infeasible. This means the runaway of reaction in the bulk polymerization.

In the production of the partial polymerizate for use in the second acrylic pressure sensitive adhesive tape of the present invention, the temperature of reaction system is rapidly increased so as to fall within the range of 100 to 140° C. mainly by the use of reaction heat generated by the polymerization reaction which is induced by the use of a small amount of polymerization initiator of low 10-hr half-life temperature, namely, 41.0° C. or below, and the polymerization initiator is consumed within a short period of time. Thus, the reaction maximum temperature is controlled at 140° C. or below at which the reaction control is practicable.

The shorter the duration in which this reaction maximum temperature reached is maintained within the range of 100 to 140° C., the greater the advantage. It is preferred that the reaction maximum temperature reached be maintained within the above range for a period of 30 sec to 2 min. When the duration in which the maximum temperature reached is maintained within the above temperature range is far shorter than the above lower limit, the polymerization reaction may not be effectively advanced. On the other hand, when the duration is far longer than the above upper limit, unfavorable thermal polymerizate may occur.

Partial polymerizate wherein 5 to 50% by weight of monomers added as raw materials have been polymerized can be obtained by the one-time polymerization reaction using the above selected polymerization initiator.

When this process is repeated by further addition of polymerization initiator according to necessity, at each time, 5 to 50% by weight of the sum of polymer and monomers having a polymerizable unsaturated group will react. The repetition of this operation enables increasing the proportion of polymer in the partial polymerizate. Moreover, the reaction at each step proceeds under mild conditions, so that there would not occur a multiplicity of short chain polymers as encountered in products of runaway bulk polymerization and that a homogeneous polymer of uniform molecular weight could be produced.

In the process of the present invention, the monomers are heated or warmed to such a temperature that a polymerization reaction can proceed when the polymerization initiator is added. The polymerization reaction is advanced by adding the above specified amount of polymerization reaction initiator specified above to the monomers. The temperature of monomers at the time of addition of the polymerization initiator is generally in the range of 20 to 80° C., preferably 35 to 70° C., and still preferably 40 to 65° C. The polymerization initiator is added to the thus heated or warmed monomers generally under agitation.

The above process provides a mode of process comprising first heating the monomers and subsequently adding the polymerization initiator. The mixing and heating of monomers and polymerization initiator can be performed in arbitrary sequence. For example, mixing of the monomers and polymerization initiator can be followed by heating to a temperature for reaction initiation. Alternatively, as aforementioned, heating of the monomers to a temperature for reaction initiation can be followed by addition and mixing of the polymerization initiator.

The monomer heating temperature required for effectively initiating the above polymerization reaction is generally in the range of 20 to 80° C., preferably 35 to 70° C., and still preferably 40 to 65° C. Upon the heating to such a temperature, the polymerization initiator begins to effectively act, and thus the polymerization reaction begins to effectively advance.

Once the polymerization reaction is thus initiated, the polymerization initiator is continuously decomposed to enable advancing of the reaction. Hence, the temperature of reaction system immediately comes to fall within the range of 100 to 140° C. Therefore, generally, heating or warming is not needed after the initiation of reaction. Further, as long as the above polymerization initiator is used in the above manner, the maximum temperature does not exceed 140° C. Hence, any special cooling is not needed. However, the present invention does not exclude temperature controlling operations, such as heating, warming and cooling, for controlling the temperature of reaction system at this stage.

Upon the initiation of polymerization reaction, the temperature of reaction system is sharply increased by the self-exothermic property thereof. When the maximum temperature reached comes to fall within the range of 100 to 140° C., the added polymerization initiator is substantially completely consumed with the result that the amount of heat generation in accordance with the progress of reaction is reduced to such a degree that the heat released from the reaction system is greater than the heat generated. Therefore, the temperature of reaction system will be no longer increased, and, if the reaction system is allowed to stand intact, the temperature of reaction system will become lower than 100° C. In the present invention, although the reaction mixture having reached the maximum temperature can be cooled by allowing it to stand intact, it is preferred to lower the temperature of reaction system to below 100° C. as immediately as possible. Therefore, once the temperature of reaction system has reached the maximum temperature, use can be made of cooling apparatuses installed to the reactor. Alternatively, a method of adding monomers not heated to the reaction system (monomer thinning) to thereby lower the temperature of reaction system to below 100° C. within a short period of time can be employed. Also, use can be made of a combination thereof. Thus, the temperature of reaction system can be lowered to below 100° C. by known cooling operation or means. In the monomer thinning, it is preferred to use monomers contained in the reaction system. The amount of monomers used in the monomer thinning is generally in the range of 10 to 50 parts by weight, preferably 20 to 30 parts by weight, per 100 parts by weight of initially charged monomers.

As a result of the above reaction, there can be obtained a syrup of partial polymerizate wherein 15 to 50% by weight of charged monomers have been polymerized. The thus obtained partial polymerizate syrup is in the form of a viscous liquid generally having a viscosity of 0.1 to 50 Pa·S (measured at 23° C. by means of Brookfield type viscometer). For the use in coating a support, it is preferred to employ a partial polymerizate having a viscosity, as measured in the above manner, of 1 to 50 Pa·S.

In the present invention, operations comprising cooling the thus obtained partial polymerizate syrup to below 100° C., mixing a small amount of the polymerization initiator of 41.0° C. or below 10-hr half-life temperature into the partial polymerizate syrup and heating the mixture to thereby resume polymerization can be performed. Repetition of these operations leads to gradual increase of the degree of polymerization of the partial polymerizate syrup.

As apparent from the above, in the present invention, use is made of the monomers having a polymerizable unsaturated bond together with the specified amount of specified polymerization initiator. This mixture may further be loaded with a chain transfer agent, such as n-dodecylmercaptan, butylmercaptan, 3-mercaptopropionic acid, thioglycolic acid or a thioglycolic acid ester. This chain transfer agent is generally added in an amount of 0.001 to 10 parts by weight, preferably 0.01 to 0.5 part by weight, per 100 parts by weight of monomers used.

In the present invention, the polymerization reaction is preferably performed under agitation. Further, the polymerization reaction is preferably performed in an inert atmosphere of, for example, nitrogen gas. Still further, the oxygen dissolved in raw materials used might hinder the advance of reaction. Hence, it is preferred to remove any oxygen dissolved in employed raw materials before the use thereof.

The second acrylic pressure sensitive adhesive tape of the present invention is obtained by coating at least one surface of a support with the pressure sensitive adhesive composition comprising the partial polymerizate produced in the above manner, crosslinking agent and photopolymerization initiator and photopolymerizing the pressure sensitive adhesive composition so as to a pressure sensitive adhesive layer superimposed on the support surface.

An epoxy crosslinking agent and an isocyanate crosslinking agent are used individually or in combination as the crosslinking agent. Useful epoxy crosslinking agent can be, for example, 1,3-bis(N,N-diglycidylaminomethyl)cyclohexane or N,N,N',N'-tetraglycidyl-m-xylylenediamine. The isocyanate crosslinking agent can be, for example, trimethylhexamethylenediamine or isophorone diisocyanate.

The photopolymerization initiator can be, for example, any of 4-(2-hydroxyethoxy)phenyl (2-hydroxy-2-propyl) ketone, α-hydroxy-α,α'-dimethylacetophenone, 2,2-dimethoxy-2-phenylacetophenone, 2-hydroxy-2-cyclohexylacetophenone, benzyldimethylketal, a halogenated ketone, an acylphosphine oxide and an acyl phosphonate. These photopolymerization initiators can be used individually or in combination.

The crosslinking agent is generally used in an amount of 0.001 to 10 parts by weight, preferably 0.005 to 5 parts by weight, per 100 parts by weight of the above partial polymerizate. The photopolymerization initiator is generally used in an amount of 0.0001 to 10 parts by weight, preferably 0.001 to 6parts by weight, per 100 parts by weight of the above monomers. The pressure sensitive adhesive composed of these components can be produced by homogeneously mixing the above components together under agitation.

This pressure sensitive adhesive may further be incorporated with a tackifier, an antioxidant, an inorganic filler, an organic filler, a pigment, etc. according to necessity.

As the support to be coated with the above pressure sensitive adhesive, there can be used, for example, paper, a plastic film (PET film, polyamide film or polyolefin film), a nonwoven fabric, or a release-treated paper or plastic film. It is preferred that the support be flexible.

At least one surface of this support is coated with the above pressure sensitive adhesive. The coating thickness of the pressure sensitive adhesive, although can appropriately be selected depending on, for example, the field of application of the acrylic pressure sensitive adhesive, is generally in the range of 0.01 to 3 mm, preferably 0.015 to 1 mm. Thus, the average thickness of the second acrylic pressure sensitive adhesive tape of the present invention is generally in the range of 0.012 to 3 mm, preferably 0.02 to 1 mm.

In the production of the second acrylic pressure sensitive adhesive tape of the present invention, at least one surface of the above support is coated with the pressure sensitive adhesive by the use of, for example, a roll coater, a die coater, a bar coater, a comma coater, a gravure coater or a Mayor bar coater. The viscosity of applied pressure sensitive adhesive is preferably in the range of 1 to 50 Pa·S, still preferably 1 to 30 Pa·S. According to necessity, the coating can be performed while heating.

After the coating of the support surface with the pressure sensitive adhesive, the pressure sensitive adhesive applied on the support is irradiated with light such as ultraviolet light to thereby cause the polymerizable components of the pressure sensitive adhesive to polymerize. Specifically, the crosslinking agent and monomer component contained in the partial polymerizate are photopolymerized. The duration of irradiating the pressure sensitive adhesive with light such as ultraviolet light is generally in the range of 1 to 300 sec, preferably 1 to 180 sec.

As a result of this light irradiation, most of the monomer component is polymerized, and thereafter a crosslinked structure is formed by the crosslinking agent. The gel fraction of the pressure sensitive adhesive constituting the pressure sensitive adhesive layer of the acrylic pressure sensitive adhesive tape is generally in the range of 5 to 90% by weight.

The pressure sensitive adhesive layer of the second acrylic pressure sensitive adhesive tape of the present invention is transparent and has the property of being resistant to yellow discoloration.

The thus produced acrylic pressure sensitive adhesive tape of the present invention is wound with the use of, for example, a release paper according to necessity.

There is no particular limitation with respect to the widths of the pressure sensitive adhesive tape and acrylic pressure sensitive adhesive tape according to the present invention. The pressure sensitive adhesive tape and acrylic pressure sensitive adhesive tape according to the present invention comprehend not only tape forms but also wide sheet forms.

The second acrylic pressure sensitive adhesive tape of the present invention is produced by coating the support with the pressure sensitive adhesive composition containing the specified partial polymerizate wherein no solvent is contained and irradiating the pressure sensitive adhesive layer formed on the support by coating with light to thereby polymerize unreacted monomers. Thus, the obtained acrylic pressure sensitive adhesive tape exhibits excellent adherence and thermal stability.

The acrylic pressure sensitive adhesive composition of the present invention comprises, in specified proportions, an adherent polymer of high molecular weight (a), monomers (c) whose principal component is a (meth)acrylic ester and a tackifier resin of low molecular weight (b). The pressure sensitive adhesive tape obtained by coating a support with this acrylic pressure sensitive adhesive composition and irradiating the acrylic pressure sensitive adhesive composition with, for example, ultraviolet light to effect polymerization exhibits very high bond strength. In particular, the pressure sensitive adhesive obtained from the acrylic pressure sensitive adhesive composition of the present invention is excellent in adherence to polyolefins whose bonding has been difficult. Further, the curability thereof exhibited at the time of forming the first pressure sensitive adhesive tape of the present invention is excellent.

Moreover, the above adhesive properties are further enhanced by adding a crosslinking agent to the acrylic pressure sensitive adhesive composition of the present invention to thereby obtain a pressure sensitive adhesive.

Furthermore, the acrylic pressure sensitive adhesive composition of the present invention substantially does not contain any solvents. Accordingly, at the time of producing the pressure sensitive adhesive, not only any solvent removing operation is not needed but also environmental pollution by solvents can be avoided. The acrylic pressure sensitive adhesive composition of the present invention does not contain any solvents as mentioned above, and the pressure sensitive adhesive obtained from the acrylic pressure sensitive adhesive composition does not contain any solvents. Further, this pressure sensitive adhesive substantially does not contain any low-boiling-point substances. Therefore, the odor, such as that attributed to residual organic solvents and peculiar to conventional pressure sensitive adhesives, of this pressure sensitive adhesive is little.

The second acrylic pressure sensitive adhesive tape of the present invention is produced by coating a support with a pressure sensitive adhesive comprising a partial polymerizate, preferably obtained by bulk polymerization of monomers having a polymerizable unsaturated bond, a crosslinking agent and a photopolymerization initiator and irradiating the thus formed pressure sensitive adhesive layer with light to thereby polymerize remaining monomers. Therefore, the second acrylic pressure sensitive adhesive tape of the present invention can be produced while controlling the polymerization reaction. The thus obtained second acrylic pressure sensitive adhesive tape of the present invention exhibits not only excellent adherence but also desirable thermal stability. Further, the second acrylic pressure sensitive adhesive tape of the present invention enables reducing the yellow discoloration of pressure sensitive adhesive layer and exhibits stable bonding performance.

EXAMPLES

The present invention will be described in greater detail below with reference to the following Examples, which, however, in no way limit the scope of the invention.

(1) Preparation of Adherent Polymer, Partial Polymerizate Syrup A 700 g of butyl acrylate (BA), 255 g of 2-ethylhexyl acrylate (2-EHA), 40 g of acrylic acid (AA) and 5 g of 2-hydroxyethyl acrylate (2-HEA) as polymerizable monomers were charged in a 2-lit. four-necked flask equipped with an agitator, a thermometer, a nitrogen gas inlet tube and a condenser. Further, 0.2 g of n-dodecylmercaptan (NDM) as a molecular weight modifier was added to the monomers. The mixture was heated to 60° C. in a nitrogen stream, and the heating was stopped at the temperature.

Subsequently, 0.2 g of azobisisobutyronitrile as a polymerization initiator was added to the mixture under agitation, and a reaction was performed for 30 min. Thus, partial polymerizate syrup A was obtained.

The thus obtained partial polymerizate syrup A was a viscous resin solution of 22% by weight of polymer content having a viscosity of 5 Pa·S. In the partial polymerizate, residual monomers were contained in an amount of 78% by weight.

Formed copolymer was separated from the obtained partial polymerizate syrup A, and the weight average molecular weight (Mw) of the copolymer was measured by gel permeation chromatography (GPC). The weight average molecular weight was 620,000. The glass transition temperature (Tg) of the copolymer was −59° C.

(2) Preparation of Adherent Polymer, Partial Polymerizate Syrup B 915 g of 2-ethylhexyl acrylate (2-EHA), 80 g of acrylic acid (AA) and 5 g of 2-hydroxyethyl acrylate (2-HEA) as polymerizable monomers were charged in a 2-lit. four-necked flask equipped with an agitator, a thermometer, a nitrogen gas inlet tube and a condenser. Further, 0.1 g of n-dodecylmercaptan (NDM) as a molecular weight modifier was added to the monomers. The mixture was heated to 60° C. in a nitrogen stream, and the heating was stopped at the temperature.

Subsequently, 0.2 g of azobisisobutyronitrile as a polymerization initiator was added to the mixture under agitation, and a reaction was performed for 30 min. Thus, partial polymerizate syrup B was obtained.

The thus obtained partial polymerizate syrup B was a viscous resin solution of 25% by weight of polymer content having a viscosity of 9 Pa·S. In the partial polymerizate, residual monomers were contained in an amount of 75% by weight.

Formed copolymer was separated from the obtained partial polymerizate syrup B, and the Mw of the copolymer was measured by GPC. The Mw was 690,000. The glass transition temperature (Tg) of the copolymer was −77° C.

Preparation of Tackifier Resin

Tackifier resins of the compositions and properties listed in Table 1 were prepared by producing partial polymerizate syrups in the same manner as in the preparation of adherent polymers and effecting further polymerization thereof to a degree of polymerization of 100%.

TABLE 1

| | Monomer composition (wt. %) | | | | | | | | | Tg |
|---|---|---|---|---|---|---|---|---|---|---|
| | IBOA | MMA | NBMA | IBMA | CHMA | IBOMA | MAA | HEMA | Mw | (° C.) |
| (1) | — | — | — | 100 | — | — | — | — | 5000 | 48 |
| (2) | — | — | — | 30 | 70 | — | — | — | 9000 | 60 |
| (3) | 100 | — | — | — | — | — | — | — | 1700 | 94 |
| (4) | — | — | 100 | — | — | — | — | — | 5000 | 20 |
| (5) | — | — | — | 97 | — | — | — | 3 | 5000 | 48 |
| (6) | — | — | — | — | — | 97 | 3 | — | 3000 | 180 |

NOTE)
IBOA = isobornyl acrylate  CHMA = cyclohexyl methacrylate
MMA = methyl methacrylate  IBOMA = isobornyl methacrylate
NBMA = n-butyl methacrylate  MAA = methacrylic acid
IBMA = isobutyl methacrylate
HEMA = 2-hydroxyethyl methacrylate
Numbers (1) to (6) are identification numbers for identifying the type of employed tackifier resin.

Examples 1 to 8

The obtained partial polymerizate syrups A and B were mixed with the obtained tackifier resins in the proportions specified in Table 2, thereby obtaining acrylic pressure sensitive adhesive compositions of nonsolvent type according to the present invention. Each of the acrylic pressure sensitive adhesive compositions was incorporated with, per 100 parts by weight thereof, 0.5 part by weight of benzophenone as a photopolymerization initiator together with an isocyanate crosslinking agent or epoxy crosslinking agent, and homogeneously mixed.

A surface of polyester film was coated with each of the obtained mixtures at a thickness of 0.05 mm, and irradiated with ultraviolet light for 1 min to thereby effect polymerization. Thus, pressure sensitive adhesive tapes according to the present invention were obtained.

With respect to the obtained pressure sensitive adhesive tapes, the retention strength and the 180-degree peel strength to polypropylene (PP) were measured.

Comparative Examples 1 and 2

Pressure sensitive adhesive tapes were produced in the same manner as in Examples 1 to 8 except that no tackifier resin was added. With respect to the obtained pressure sensitive adhesive tapes, the retention strength and the 180-degree peel strength to PP were measured.

Comparative Example 3

Pressure sensitive adhesive tape was produced in the same manner as in Examples 1 to 8 except that a rosinate derivative was used as the tackifier resin.

Comparative Examples 4 to 6

Acrylic pressure sensitive adhesive compositions of non-solvent type falling outside of the scope of the present invention were prepared, and pressure sensitive adhesive tapes were produced therefrom in the same manner as in the above Examples. With respect to the obtained pressure sensitive adhesive tapes, the retention strength and the 180-degree peel strength to PP were measured.

(3) Preparation of Adherent Polymer, Partial Polymerizate Syrup C

Partial polymerizate syrup C whose polymerizable monomer weight ratio was butyl acrylate (BA)/2-ethylhexyl acrylate (2-EHA)/acrylic acid (AA)/2-hydroxyethyl acrylate (2-HEA)=70/25.5/4/0.5 was prepared in the same manner as the partial polymerizate syrup A. The thus obtained partial polymerizate syrup C was a viscous resin solution of 30% by weight of polymer content having a viscosity of 0.2 Pa·S. With respect to formed polymer, the weight average molecular weight (Mw) was 46,000 and the glass transition temperature (Tg) was −59° C.

The results of the above Examples 1 to 8 and Comparative Examples 1 to 6 are listed in Tables 2 and 3. The bond strength and retention strength were measured in accordance with the following methods.

<Bond Strength>

The 180-degree peel strength (g/20 mm width) of each of the pressure sensitive adhesive tapes was measured in accordance with Japanese Industrial Standard (JIS) Z 0237 with the use of a polypropylene plate as an adherend.

<Retention Strength>

One end portion of each of the pressure sensitive adhesive tapes was stuck to a SUS plate so that the adhesion area was 20 mm×20 mm. Pressure was applied to the adhesion area by reciprocating a 2 kg roller once thereon, and the SUS plate having the pressure sensitive adhesive tape stuck thereto was allowed to stand still in a 80° C. atmosphere for 20 min. Thereafter, a 1 kg weight was installed to the other end of the pressure sensitive adhesive tape, and the time until weight drop or the distance of slip having occurred 1 hr later was measured.

TABLE 2

| | Pressure sensitive adhesive compsn. | | addn. amt. (wt. % of compsn.) | 180-deg. peel strength to PP (g/20 mm width) | Retention strength |
|---|---|---|---|---|---|
| | partial polymerizate syrup | tackifier resin | | | |
| Example 1 | A | (1) | 17 | 1000 | 0.6 mm slip |
| Example 2 | A | (1) | 33 | 1100 | 0.6 mm slip |
| Example 3 | A | (2) | 17 | 1200 | 0.6 mm slip |
| Example 4 | A | (3) | 17 | 850 | 0.6 mm slip |
| Example 5 | A | (4) | 17 | 800 | 0.6 mm slip |
| Example 6 | A | (5) | 17 | 1200 | 0.6 mm slip |
| Example 7 | B | (6) | 17 | 1000 | 0.6 mm slip |
| Example 8 | A | (2) + (5) | 9 + 8 | 1200 | 0.6 mm slip |
| Comp. Ex.1 | A | nil | — | 550 | 0.6 mm slip |
| Comp. Ex.2 | B | nil | — | 500 | 0.6 mm slip |
| Comp. Ex.3 | A | rosinate deriv | 17 | polymn. did not completely advance | — |

TABLE 3

| | Pressure sensitive adhesive compsn. falling outside of the scope of the invention | | | | addn. amt. (wt. % of compsn.) | 180-deg. peel strength to PP (g/20 mm Width) | Retention strength |
|---|---|---|---|---|---|---|---|
| | partial polymerizate syrup | tackifier resin | | | | | |
| | | monomer compsn. | Mw | Tg | | | |
| Comp. Ex. 4 | A | IBMA 100 wt. % | 25000 | 48° C. | 17 | X | X |
| Comp. Ex. 5 | A | tackifier resin (1) | | | 45 | ◯ | X |

TABLE 3-continued

| | Pressure sensitive adhesive compsn. falling outside of the scope of the invention | | | | 180-deg. peel | |
|---|---|---|---|---|---|---|
| partial polymer-izate syrup | monomer compsn. | tackifier resin Mw | Tg | addn. amt. (wt. % of compsn.) | strength to PP (g/20 mm Width) | Retention strength |
| Comp. Ex. 6 | C | tackifier resin (1) | | 17 | ○ | X |

NOTE)
Bond strength X: less than 500 g/20 mm.
Bond strength ○: 500 g/20 mm or greater.
Retention strength X: dropped at the measurement of retention strength even when the addition amount of crosslinking agent was regulated.

Preparation of Partial Polymerizate D 91.5 g of 2-ethylhexyl acrylate (2-EHA), 8 g of acrylic acid (AA), 0.5 g of 2-hydroxyethyl acrylate (2-HEA) and 0.06 g of n-dodecylmercaptan (NDM) were charged in a 0.2-lit. four-necked flask equipped with an agitator, a thermometer, a nitrogen gas inlet tube and a codenser. The mixture was heated to 50° C. in a nitrogen stream, and the heating was stopped at the temperature.

Subsequently, 0.0025 g of 2,2'-azobis(4-methoxy-2,4-dimethylvaleronitrile) (10-hr half-life temperature: 30° C./in toluene) as a polymerization initiator was added to the mixture under agitation, and homogeneously mixed.

The agitation was continued after the addition of the polymerization initiator. Although a temperature rise attributed to a heat of polymerization was observed 3 min later, the heat generation was allowed to proceed to attain an advance of reaction without cooling the flask. The temperature of reaction system reached 118° C. Further, agitation was continued with the result that the polymerization initiator added to the reaction system was completely consumed and that no further temperature increase of the reaction system occurred. There was no runaway of reaction. With respect to the reaction product, the polymerization initiator was analyzed. As a result, it was found that the whole amount of added polymerization initiator had been deactivated.

Not only were 22.8 g of 25° C. 2-EHA, 2 g of 25° C. AA and 0.2 g of 2-HEA added as cooling agents thereto but also an external cooling unit was used, so that the temperature of the reaction system was rapidly cooled to 100° C. or below. While continuing external cooling, further, 160 g of 2-EHA, 14 g of AA and 1 g of 2-HEA were added. Thus, partial polymerizate D was obtained.

With respect to the obtained partial polymerizate D, the polymer content was 10% and the viscosity was 1 Pa·S.

Preparation of Partial Polymerizate E 91.5 g of 2-EHA, 8 g of AA, 0.5 g of 2-HEA and 0.06 g of NDM were charged in a 0.2-lit. four-necked flask equipped with an agitator, a thermometer, a nitrogen gas inlet tube and a condenser. The mixture was heated to 50° C. in a nitrogen stream, and the heating was stopped at the temperature.

Subsequently, 0.0025 g of 2,2'-azobis(4-methoxy-2,4-dimethylvaleronitrile) as a polymerization initiator was added to the mixture under agitation, and homogeneously mixed.

The agitation was continued after the addition of the polymerization initiator. Although a temperature rise attributed to a heat of polymerization was observed 3 min later, the heat generation was allowed to proceed to attain an advance of reaction without cooling the flask. The temperature of reaction system reached 118° C. Further, agitation was continued with the result that the polymerization initiator added to the reaction system was completely consumed and that no further temperature increase of the reaction system occurred. There was no runaway of reaction. With respect to the reaction product, the polymerization initiator was analyzed. As a result, it was found that the whole amount of added polymerization initiator had been deactivated.

Not only were 22.8 g of 25° C. 2-EHA, 2 g of 25° C. AA and 0.2 g of 2-HEA added as cooling agents thereto but also an external cooling unit was used, so that the temperature of the reaction system was rapidly cooled to 50° C. Thereafter, 0.03 g of NDM and 0.005 g of 2,2'-azobis(4-methoxy-2,4-dimethylvaleronitrile) were added to the mixture, and homogeneously mixed.

The agitation was continued after the addition of the polymerization initiator. Although a temperature rise attributed to a heat of polymerization was observed 3 min later, the heat generation was allowed to proceed to attain an advance of reaction without cooling the flask. The temperature of reaction system reached 117° C. Further, agitation was continued with the result that the polymerization initiator added to the reaction system was completely consumed and that no further temperature increase of the reaction system occurred. There was no runaway of reaction. With respect to the reaction product, the polymerization initiator was analyzed. As a result, it was found that the whole amount of added polymerization initiator had been deactivated.

Not only were 22.5 g of 25° C. 2-EHA, 2 g of 25° C. AA and 0.2 g of 25° C. 2-HEA added as cooling agents thereto but also an external cooling unit was used, so that the temperature of the reaction system was rapidly cooled to 100° C. or below. External cooling was continued, and partial polymerizate E was obtained.

With respect to the obtained partial polymerizate E, the polymer content was 50% and the viscosity was 31 Pa·S.

Example 9

0.08 g of epoxy crosslinking agent (trade name: Tetrad-X, produced by Mitsubishi Gas Chemical Co., Inc.) was added to 100 g of partial polymerizate D. Further, photoinitiator (trade name: Irgacure 500, produced by Ciba-Geigy Japan) was added to the mixture in an amount of 0.5 part by weight per 100 parts by weight of monomers. Thus, a pressure sensitive adhesive composition was obtained.

A surface of 25 μm thick polyester film (support) was coated with the obtained pressure sensitive adhesive composition by means of a doctor blade so as to form a 30 μm thick layer. This layer was irradiated with ultraviolet light with the use of high pressure mercury lamps for 60 sec, thereby forming a pressure sensitive adhesive layer. Thereafter, the support having the pressure sensitive adhesive layer formed thereon was allowed to stand still at 23° C. for 10 days to thereby advance crosslinking reaction. Thus, a pressure sensitive adhesive tape was obtained.

The adhesive properties of the obtained pressure sensitive adhesive tape were measured. As a result, it was found that the pressure sensitive adhesive tape had excellent adhesive properties. The gel fraction of pressure sensitive adhesive layer was 66%.

The properties of the acrylic pressure sensitive adhesive tape are listed in Table 4.

Example 10

A pressure sensitive adhesive tape was produced in the same manner as in Example 9 except that, in place of the epoxy crosslinking agent, use was made of 0.8 g of isocyanate crosslinking agent (trade name: Coronate L, produced by Nippon Polyurethane Co., Ltd.).

The adhesive properties of the obtained pressure sensitive adhesive tape were measured. As a result, it was found that the pressure sensitive adhesive tape had excellent adhesive properties. The gel fraction of pressure sensitive adhesive layer was 62%.

The properties of the acrylic pressure sensitive adhesive tape are listed in Table 4.

Example 11

A pressure sensitive adhesive tape was produced in the same manner as in Example 9 except that the pressure sensitive adhesive composition E was employed.

The adhesive properties of the obtained pressure sensitive adhesive tape were measured. As a result, it was found that the pressure sensitive adhesive tape had excellent adhesive properties. The gel fraction of pressure sensitive adhesive layer was 66%.

The properties of the acrylic pressure sensitive adhesive tape are listed in Table 4.

Comparative Example 7

A pressure sensitive adhesive tape was produced in the same manner as in Example 11 except that, in place of the epoxy crosslinking agent, use was made of polyfunctional monomer (trade name: Light-acrylate TMP-A, produced by Kyoeisha Chemical Co., Ltd.) as a crosslinking component. The polyfunctional monomer was added in an amount of 0.1 part by weight per 100 parts by weight of partial polymerizate.

The adhesive properties of the thus obtained acrylic pressure sensitive adhesive tape were measured. As a result, it was found that the thermal stability performance of the acrylic pressure sensitive adhesive tape was poor. The reason would be that it is difficult for the polymer contained in the pressure sensitive adhesive composition to have a crosslinked structure.

The properties of the acrylic pressure sensitive adhesive tape are listed in Table 4.

Comparative Example 8
Preparation of Pressure Sensitive Adhesive of Solvent Type
91.5 g of 2-EHA, 8 g of AA, 0.5 g of 2-HEA and 80 g of toluene were charged in a 0.2-lit. four-necked flask equipped with an agitator, a thermometer, a nitrogen gas inlet tube and a condenser. 0.1 g of azobisisobutyronitrile was added to the mixture at 70° C. in a nitrogen stream, and a reaction was performed for 5 hr. For thinning, toluene was added. Thus, there was obtained a viscous resin solution of 30% polymer content. The Mw of the polymer was 200,000.

0.08 g of epoxy crosslinking agent (tradename: Tetrad-X, produced by Mitsubishi Gas Chemical Co., Inc.) was added to 333 g of obtained resin solution (polymer contained: 100 g). Thus, a pressure sensitive adhesive mixture was obtained.

A surface of 25 μm thick polyester film (support) was coated with the obtained pressure sensitive adhesive mixture by means of a doctor blade, and dried by a dryer set for 80° C. for 2 min. Thus, an intended pressure sensitive adhesive tape was obtained. The thickness of pressure sensitive adhesive layer was regulated so as to become 30 μm.

The adhesive properties of the obtained pressure sensitive adhesive tape were measured. As a result, it was found that the pressure sensitive adhesive tape had good adhesive properties. However, upon the measurement of the amount of residual solvent by gas chromatography, it was found that the amount of residual solvent was as large as 100 ppm, thereby causing the pressure sensitive adhesive tape to have strong odor. The gel fraction of pressure sensitive adhesive layer was 67%.

The properties of the acrylic pressure sensitive adhesive tape are listed in Table 4.

TABLE 4

| | Pressure sensitive adhesive compsn. | Crosslinking component | Thermal stability retention strength | Adhesive strength (N/m) | Gel fraction (%) | Residual solvent ppm |
|---|---|---|---|---|---|---|
| Example 9 | D | Epoxy crosslinking agent | 0.3 mm slip | 490 | 65 | — |
| Example 10 | D | Isocyanate crosslinking agent | 0.3 mm slip | 480 | 62 | — |
| Example 11 | E | Epoxy crosslinking agent | 0.3 mm slip | 470 | 66 | 0 |
| Comp. Ex. 7 | E | Polyfunctional monomer 0.1 part | 2.0 mm slip | 470 | 53 | — |
| Comp. Ex. 8 | solvent type | Epoxy crosslinking agent | 0.3 mm slip | 480 | 67 | 100 |

NOTE) The properties listed in Table 4 were measured in the following manners.
* Measurement of thermal stability retention strength: In accordance with Japanese Industrial Standard (JIS) Z 0237 relating to the method of testing pressure sensitive adhesive tapes, the distance of slip having occurred 60 min later upon application of a load of 1 kg at 80 ° C. was measured with respect to a stuck area of 25 mm × 25 mm using SUS as an adherend.
* Measurement of adhesive strength: The 180° peel strength to SUS was measured in accordance with Japanese Industrial Standard (JIS) Z 0237 relating to the method of testing pressure sensitive adhesive tapes.
* Measurement of gel fraction: 0.2 g of pressure sensitive adhesive was weighed out, immersed in 50 g of tetrahydrofuran overnight, and filtered through a 200-mesh metal net. The residue on the metal net was dried by a dryer set for 110° C. for 5 hr, and the weight thereof was measured. The gel fraction was calculated from the weight ratio of collected sample.

What is claimed is:
1. An acrylic pressure sensitive adhesive composition comprising:
(a) 5 to 75 parts by weight of an adherent polymer comprising (meth)acrylic ester component units as principal structural units and having a weight average molecular weigh: of 50,000 or more,

(b) 5 to 40 part, by weight of a tackifier resin comprising (meth)acrylic ester component units as principal structural units and having a weight average molecular weight of 20,000 or less, and c) 20 to 90 parts by weight of monomers whose principal component is a (meth)acrylic ester, provided that the sum of component (a), component (b) and component (c) is 100 parts by weight, wherein substantially no solvent is contained in the acrylic pressure sensitive adhesive composition.

2. The acrylic pressure sensitive adhesive composition as claimed in claimed 1, wherein the adherent polymer (a) has a glass transition temperature of 0° C. or below.

3. The acrylic pressure sensitive adhesive composition as claimed in claim 1, wherein the tackifer resin (b) has a glass transition temperature of 40° C. or higher.

4. The acrylic pressure sensitive adhesive composition as claimed in claim 1, wherein the tackifier resin (b) has a weight average molecular weight of 10,000 or less.

5. The acrylic pressure sensitive adhesive composition as claimed in claim 3, wherein the (meth)acrylic ester component units as a constituent of the tackifier resin (b) contain at least component units selected from the group consisting of component units derived from an ester of (meth)acrylic acid and an alcohol having an alkyl group of 1 to 4 carbon atoms, component units derived from an ester of (meth) acrylic acid and an alicyclic alcohol having 3 to 14 carbon atoms and component units derived from an ester of(meth) acrylic acid and benzyl alcohol in an amount of 50 parts by weight or more per 100 parts by weight of (meth)acrylic ester component units, and wherein the tackifier resin (b) has a weight average molecular weight of 400 to 10,000.

6. The acrylic pressure sensitive adhesive composition as claimed in claim 1, wherein the tackifier resin (b) has a functional group which is reactive with an epoxy group or an isocyanate group.

7. The acrylic pressure sensitive adhesive composition as claimed in claim 1, wherein the adherent polymer (a) is an adherent polymer produced by partial polymerization of monomers whose principal component is a (meth)acrylic ester.

8. The acrylic pressure sensitive adhesive composition as claimed in claim 1, wherein a mixture of the adherent polymer (a) and monomers (c) whose principal component is a (meth)acrylic ester has a viscosity of 1 to 100 Pa·S at 25° C.

9. The acrylic pressure sensitive adhesive composition as claimed in claim 1, wherein the tackifier resin (b) is soluble in the monomers (c) whose principal component is a (meth) acrylic ester.

10. A process for producing a pressure sensitive adhesive tape, comprising coating a support surface with a mixture of 100 parts by weight of an acrylic pressure sensitive adhesive composition and 0.01 to 3 parts by weight of a polymerization initiator at a thickness of 0.01 to 1.0 mm and polymerizing the mixture, said acrylic pressure sensitive adhesive composition comprising:

(a) 5 to 75 parts by weight of an adherent polymer comprising (meth)acrylic ester component units as principal structural units and having a weight avenge molecular weight of 50,000 or more, (b) 5 to 40 parts by weight of a tackifier resin comprising (meth)acrylic ester component units as principal structural units and having a weight avenge molecular weight off 20,000 or less, and (c) 20 to 90 parts by weight of monomers whose principal component is a (meth)acrylic ester, provided that the sum of component (a), component (b) and component (c) is 100 parts by weight, substantially no solvent contained in the acrylic pressure sensitive adhesive composition.

11. The process as claimed in claim 10, wherein the polymerization initiator is a photopolymerization initiator.

12. The process as claimed in claim 11, wherein the polymerization is effected by irradiating the mixture after coating with ultraviolet light.

13. The process as claimed in claim 10, wherein the adherent polymer (a) has a glass transition temperature of 0° C. or below.

14. The process as claimed in claim 10, wherein the tackifier resin (b) has a glass transition temperature of 40° C. or higher.

15. The process as claimed in claim 10, wherein the tackifier resin (b) has a weight average molecular weight of 10,000 or less.

16. The process as claimed in claim 14, wherein the (meth)acrylic ester component units as a constituent of the tackifier resin (b) contain at least component units selected from the group consisting of component units derived from an ester of (meth)acrylic acid and an alcohol having an alkyl group of 1 to 4 carbon atoms, component units derived from an ester of (meth)acrylic acid and an alicyclic alcohol having 3 to 14 carbon atoms and component units derived from a ester of (meth)acrylic acid and benzyl alcohol in an amount of 50 parts by weight or more per 100 parts by weight of (meth)acrylic ester component units, and wherein the tackifier resin (b) has a weight average molecular weight of 400 to 10,000.

17. The process as claimed in claim 10, wherein the tackifier resin (b) has a functional group which is reactive with an epoxy group or an isocyanate group.

18. The process as claimed in claim 10, wherein the adherent polymer (a) is an adherent polymer produced by partial polymerization of monomers whose principal component is a (meth)acrylic cater.

19. The process as claimed in claim 10, wherein a mixture of the adherent polymer (a) and monomers (c) whose principal component is a (meth)acrylic ester has a viscosity of 1 to 100 Pa·S at 25° C.

20. The process as claimed in claim 10, wherein the tackifier resin (b) is soluble in the monomers (c) whose principal component is a (meth)acrylic ester.

21. A pressure sensitive adhesive tape obtained by coating a support surface with a mixture of 100 parts by weight of an acrylic pressure sensitive adhesive composition and 0.01 to 3 parts by weight of a polymerization initiator at a thickness of 0.01 to 1.0 mm and polymerizing the mixture, said acrylic pressure sensitive adhesive composition comprising:

(a) 5 to 75 parts by weight of an adherent polymer comprising (meth)acrylic ester component units as principal structural units and having a weight average molecular weight of 50,000 or more, (b) 5 to 40 parts by weight of a tackifier resin comprising (meth)acrylic ester component units as principal structural units and having a weight average molecular weight of 20,000 or less, and (c) 20 to 90 parts by weight of monomers whose principal component is a (meth)acrylic ester, provided that the sum of component (a), component (b) and component (c) is 100 parts by weight, substantially no solvent contained in the acrylic pressure sensitive adhesive composition.

22. The pressure sensitive adhesive tape as claimed in claim 21, wherein substantially no amount of monomers (c) whose principal component is a (meth)acrylic ester remain.

23. The pressure sensitive adhesive tape as claimed in claim 21, wherein a crosslink structure formed by at least one or an epoxy compound and/an isocyanate compound.

24. An acrylic pressure sensitive adhesive tape comprising a support and, superimposed on at least one surface thereof, a pressure sensitive adhesive layer, said pressure sensitive adhesive layer formed by coating the support surface with a pressure sensitive adhesive composition and photopolymerizing the pressure sensitive adhesive composition, said pressure sensitive adhesive composition comprising:

a partial polymerizate of monomers each having a polymerizable unsaturated bond whose principal component is an acrylic acid alkyl ester, said partial polymerizate containing polymers of the monomers in an amount of 5% by weight or more, wherein the partial polymerizate is a partial polymerizate obtained through a process comprising mixing 0.0001 to 0.5 part by weight of a polymerization initiator having a 10-hr half-life temperature of 41.0° C. or below with 100 parts by weight of monomers each having a polymerizable unsaturated bond whose principal component is an acrylic acid alkyl ester, initiating a polymerization reaction of the monomers each having a polymerizable unsaturated bond and, after the initiation of the polymerization reaction, increasing a maximum temperature of reaction mixture to 100–140° C. with the use of self-exothermic property of reaction system exerted by consumption of the polymerization initiator so that 5 to 50% by weight of the employed monomers each having a polymerizable unsaturated bond are polyemized, a crosslinking agent, and a photopolymerization initiator.

25. The acrylic pressure sensitive adhesive tape as claimed in claim 24, wherein the crosslinking agent is an epoxy crosslinking agent and/or an isocyanate crosslinking agent.

26. The acrylic pressure sensitive adhesive tape as claimed in claim 24, wherein, in the pressure sensitive adhesive composition for coating the support surface, the crosslinking agent is contained in an amount of 0.0001 to 10 parts by weight per 100 parts by weight of partial polymerizate, and the photopolymerization initiator is contained in an amount of 0.0001 to 10 parts by weight per 100 parts by weight of monomers.

27. The acrylic pressure sensitive adhesive tape as claimed in claim 24, wherein the pressure sensitive adhesive of the pressure sensitive adhesive layer has a crosslink structure formed by the crosslinking agent.

28. The acrylic pressure sensitive adhesive tape as claimed in claim 24, wherein the pressure sensitive adhesive of the pressure sensitive adhesive layer has a gel fraction of 5 to 90% by weight.

29. The acrylic pressure sensitive adhesive tape as claimed in claim 24, wherein the pressure sensitive adhesive layer has an average thickness of 0.01 to 3 mm, and the acrylic pressure sensitive adhesive tape has an average thickness of 0.012 to 3 mm.

30. The acrylic pressure sensitive adhesive tape as claimed in claim 24, wherein the photopolymerization initiator is a UV polymerization initiator.

31. The acrylic pressure sensitive adhesive tape as claimed in claim 24, wherein the partial polymerizate is a partial polymerizate obtained through a process comprising heating or warming the monomers each having a polymerizable unsaturated bond to 20–80° C., adding the polymerization initiator to the heated monomers each having a polymerizable unsaturated bond and, after the addition of the polymerization initiator, discontinuing the heating or warming and increasing a maximum temperature of reaction mixture to 100–140° C. with the use of self-exothermic property of reaction system exerted by consumption of the polymerization initiator to thereby accomplish polymerization.

32. The acrylic pressure sensitive adhesive tape as claimed in claim 24, wberein the polymerization initiator hiving a 10-hr half-life temperature of 41.0° C. or below is at least one polymerization initiator selected from the group consisting of isobutyryl peroxide, α,α-bis(neodecanoylperoxy)diisopropylbenzene, curnyl peroxyncodecanoate, di-n-propyl peroxydicarbonate, diisopropyl peroxydicarbonate, di-sec-butyl peroxydicaxbonate, 1,1,3,3-tetramethylbutyl poroxyneodecanoate, bis(4-butylcyclohexyl) peroxydicarbonate and 2,2'-azobis(4-mothoxy-2,4-dimethylvaleronitrile).

33. The acrylic pressure sensitive adhesive tape as claimed in claim 24, wherein the 10-hr half-life temperature of the polymerization initiator is in the range of 20 to 41.0° C.

34. The acrylic pressure sensitive adhesive tape as claimed in claim 24, wherein the polymerization initiator is used in an amount of 0.0001 to 0.1 part by weight per 100 parts by weight of monomers each having a polymerizable unsaturated bond.

35. The acrylic pressure sensitive adhesive tape as claimed in claim 24, wherein the partial polymerizate is a partial polymerizate obtained through a process comprising, after the initiation of the reaction, increasing the temperature of reaction system to 100–below 140° C. with the use of reaction heat brought about by consumption of the polymerization initiator without heating or cooling the reaction system from outside of the reaction system.

36. The acrylic pressure sensitive adhesive tape as claimed in claim 24, wherein the partial polymerizate is a partial polymerizate obtained by carrying out at least once a process comprising causing the temperature of reaction system to be below 100° C. as a result of consumption of the polymerization initiator, mixing 0.0001 to 0.5 part by weight of the polymerization initiator having a 10-hr half-life temperature of 41.0° C. or below with 100 parts by weight of the monomers each having a polymerizable unsaturated bond which remain in the reaction system to thereby once more prepare a reaction mixture, once more initiating he polymerization reaction and, after the initiation of the polymerization reaction, increasing a maximum temperature of reaction system to 100–140° C. with the use of self-exothermic property of reaction system exerted by consumption of the polymerization initiator so that 5 to 50% by weight of the total weight of polymer and monomers each having a polymerizable unsaturated bond undergoes further polymerization.

37. The acrylic pressure sensitive adhesive tape as claimed in claim 24, wherein the partial polymerizate is a partial polymerizate obtained through a process comprising maintaining the temperature of reaction system attained with the use of self-oxothermic property at 100–below 140° C.

38. The acrylic pressure sensitive adhesive tape as claimed in claim 24, wherein the partial polymerizate is a partial polymerizate formed with the use of a polymerization initiator whose 10-hr half-life temperature is in the range of 20 to 37.0° C.

39. The acrylic pressure sensitive adhesive tape as claimed in claim 24, wherein the partial polymerizate is a partial polymerizate obtained through a process comprising, after maximization of the temperature of reaction mixture within the range of 100 to 140° C., adding nonheated monomers to the reaction mixture to thereby rapidly lower the temperature of the reaction mixture to 100° C. or below.

40. A process for producing an acrylic pressure sensitive adhesive tape, comprising coating at least one surface of a support with a pressure sensitive adhesive composition so as to form a coating layer and irradiating the coating layer with light so that the pressure sensitive adhesive composition is photopolymerized to thereby obtain the pressure sensitive adhesive layer superimposed on the support surface, said pressure sensitive adhesive composition comprising:
a partial polymerizate of monomers each having a polymerizable unsaturated bond whose principal component is an acrylic acid alkyl ester, said partial polymerizate containing polymers of the monomers in an amount of 5% by weight or mote, wherein the partial polymerizate is a partial polymerizate obtained through a process comprising mixing 0.0001 to 0.5 part by weight of a polymerization initiator having a 10-hr half-life temperature of 41.0° C. or below with 100 parts by weight of monomers each having a polymerizable unsaturated bond whose principal component is an acrylic acid alkyl ester, initiating a polymerization reaction of the monomers each having a polymerizable unsaturated bond and, after the initiation of the polymerization reaction, increasing a maximum temperature of reaction mixture to 100–140° C. with the use of self-exothermic property of reaction system exerted by consumption of the polymerization initiator so that 5 to 50% by weight of the employed monomers each having a polymerizable unsaturated bond are polyermized,
a crosslinking agent, and
a photopolymerization initiator.

41. The acrylic pressure sensitive adhesive composition as claimed in claim 2, wherein the adherent polymer (a) is an adherent polymer produced by partial polymerization of monomers whose principal component is a (meth)acrylic ester.

42. The acrylic pressure sensitive adhesive composition as claimed in claim 3, wherein the adherent polymer (a) is an adherent polymer produced by partial polymerization of monomers whose principal component is a (meth)acrylic ester.

43. The acrylic pressure sensitive adhesive composition as claimed in claim 4, wherein the adherent polymer (a) is an adherent polymer produced by partial polymerization of monomers whose principal component is a (meth)acrylic ester.

44. The acrylic pressure sensitive adhesive composition as claimed in claim 5, wherein the adherent polymer (a) is an adherent polymer produced by partial polymerization of monomers whose principal component is a (meth)acrylic ester.

45. The acrylic pressure sensitive adhesive composition as claimed in claim 6, wherein the adherent polymer (a) is an adherent polymer produced by partial polymerization of monomers whose principal component is a (meth)acrylic ester.

46. The acrylic pressure sensitive adhesive composition as claimed in claim 2, wherein a mixture of the adherent polymer (a) and monomers (c) whose principal component is a (meth)acrylic ester has a viscosity of 1 to 100 Pa·S at 25° C.

47. The acrylic pressure sensitive adhesive composition as claimed in claim 3, wherein a mixture of the adherent polymer (a) and monomers (c) whose principal component is a (meth)acrylic ester has a viscosity of 1 to 100 Pa·S at 25° C.

48. The acrylic pressure sensitive adhesive composition as claimed in claim 4, wherein a mixture of the adherent polymer (a) and monomers (c) whose principal component is a (meth)acrylic ester has a viscosity of 1 to 100 Pa·S at 25° C.

49. The acrylic pressure sensitive adhesive composition as claimed in claim 5, wherein a mixture of the adherent polymer (a) and monomers (c) whose principal component is a (meth)acrylic eater has a viscosity of 1 to 100 Pa·S at 25° C.

50. The acrylic pressure sensitive adhesive composition as claimed in claim 6, wherein a mixture of the adherent polymer (a) and monomers (c) whose principal component is a (meth)acrylic ester has a viscosity of 1 to 100 Pa·S at 25° C.

51. The acrylic pressure sensitive adhesive composition as claimed in claim 7, wherein a mixture of the adherent polymer (a) and monomers (c) whose principal component is a (meth)acrylic ester has a viscosity of 1 to 100 Pa·S at 25° C.

52. The process as claimed in claim 11, wherein the, adherent polymer (a) is an adherent polymer produced by partial polymerization of monomers whose principal component is a (meth)acrylic ester.

53. The process as claimed in claim 12, wherein the adherent polymer (a) is an adherent polymer produced by partial polymerization of monomers whose principal component is a (meth)acrylic ester.

54. The process as claimed in claim 13, wherein the adherent polymer (a) is an adherent polymer produced by partial polymerization of monomers whose principal component is a (meth)acrylic ester.

55. The process as claimed in claim 14, wherein the adherent polymer (a) is an adherent polymer produced by partial polymerization of monomers whose principal component is a (meth)acrylic ester.

56. The process as claimed in claim 15, wherein the adherent polymer (a) is an adherent polymer produced by partial polymerization of monomers whose principal component is a (meth)acrylic ester.

57. The process as claimed in claim 16, wherein the adherent polymer (a) is an adherent polymer produced by partial polymerization of monomers whose principal component is a (meth)acrylic ester.

58. The process as claimed in claim 17, wherein the adherent polymer (a) is an adherent polymer produced by partial polymerization of monomers whose principal component is a (meth)acrylic ester.

59. The process as claimed in claim 18, wherein a mixture of the adherent polymer (a) and monomers (c) whose principal component is a (meth)acrylic ester has a viscosity of 1 to 100 Pa·S at 25° C.

60. An acrylic pressure sensitive adhesive, tape comprising a support and, superimposed on at least one surface thereof, a pressure sensitive adhesive layer, said pressure sensitive adhesive layer formed by coating the support surface with a pressure sensitive adhesive composition and photopolymerizing the pressure sensitive adhesive composition, said pressure sensitive adhesive composition comprising:

a partial polymerizate of monomers each having a polymerizable unsaturated bond whose principal component is an acrylic acid alkyl ester, said partial polymerizate containing polymers of the monomers in an amount of 5% by weight or more, wherein the partial polymerizate is a partial polymerizate obtained through a process comprising mixing 0.0001 to 0.5 part by weight of a polymerization initiator having a 10-hr half-life temperature of 41.0° C. or below with 100 parts by weight of monomers each having a polymerizable unsaturated bond whose principal component is an acrylic acid alkyl ester, initiating a polymerization reaction of the monomers each having a polymerizable unsaturated bond, increasing a maximum temperature of reaction mixture to 100–140° C. with the use of self-exothermic property of reaction system exerted by consumption of the polymerization initiator after the initiation of the polymerization reaction, and additionally introducing the monomers each having a polymerizable unsaturated bond as a cooling operation to thereby rapidly lower the temperature of the reaction mixture to below 100° C. so that 5 to 50% by weight of the monomers each having a polymerizable unsaturated bond, employed in the polymerization, are polymerized, a crosslinking agent, and a photopolymerization initiator.

61. A process for producing an acrylic pressure sensitive adhesive tape, comprising coating at least one surface of a support with a pressure sensitive adhesive composition so as to form a coating layer and irradiating the coating layer with light so that the pressure sensitive adhesive composition is photopolymerized to thereby obtain the pressure sensitive adhesive layer superimposed on the support surface, said pressure sensitive adhesive composition comprising:

a partial polymerizate of monomers each having a polymerizable unsaturated bond whose principal component is an acrylic acid alkyl ester, said partial polymerizate containing polymers of the monomers in an amount of 5% by weight or more, wherein the partial polymerizate is a partial polymerizate obtained through a process of comprising mixing 0.0001 to 0.5 part by weight of a polymerization initiator having a 10-hr half-life temperature of 41.0° C. or below with 100 parts by weight of monomers each having a polymerizable unsaturated bond whose principal component is an acrylic acid alkyl ester, initiating a polymerization reaction of the monomers each having a polymerizable unsaturated bond, increasing a maximum temperature of reaction mixture to 100–400° C. with the use of self-exothermic property of reaction system exerted by consumption of the polymerization initiator after the initiation of the polymerization reaction, and additionally introducing the monomers each having a polymerizable unsaturated bond as a cooling operation to thereby rapidly lower the temperature of the reaction mixture to below 100° C. so that 5 to 50% by weight of the monomers each having a polymerizable unsaturated bond, employed in the polymerization, are polymerized, a crosslinking agent, and a photopolymerization initiator.

* * * * *

UNITED STATES PATENT AND TRADEMARK OFFICE
CERTIFICATE OF CORRECTION

PATENT NO.    : 6,783,850 B2
DATED         : August 31, 2004
INVENTOR(S)   : Takizawa et al.

It is certified that error appears in the above-identified patent and that said Letters Patent is hereby corrected as shown below:

Title page,
Item [56], References Cited, OTHER PUBLICATIONS, second from last reference, "JP-05216" should read -- JP-057216 --; last reference, "Fujikara Kasei Co., Ltd." should read -- Fujikura Kasei Co., Ltd. --

Column 34,
Line 67, "molecular weigh of" should read -- molecular weight of --

Column 35,
Line 1, "5 to 40 part" should read -- 5 to 40 parts --

Column 36,
Line 40, "a (meth)acrylic cater" should read -- a (meth)acrylic ester --

Column 37,
Line 7, "structure formed" should read -- structure is formed --
Line 8, "one or an" should read -- one of an --
Line 36, "bond are polemized" should read -- bond are polymerized --

Column 38,
Line 19, "curnyl" should read -- cumyl --
Line 21, "di-sec-peroxydicaxbonate" should read -- di-sec-perosydicarbibate --
Line 65, "self-oxothermic property" should read -- self-exothermic property --

Column 39,
Line 22, "weight or mote" should read -- weight or more --

Column 40,
Line 16, "(meth)acrylic eater" should read -- (meth)acrylic ester --

UNITED STATES PATENT AND TRADEMARK OFFICE
CERTIFICATE OF CORRECTION

PATENT NO.    : 6,783,850 B2
DATED         : August 31, 2004
INVENTOR(S)   : Takizawa et al.

It is certified that error appears in the above-identified patent and that said Letters Patent is hereby corrected as shown below:

<u>Column 42,</u>
Line 19, "100-400ºC" should read -- 100-140ºC --

Signed and Sealed this

Seventh Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,783,850 B2
DATED : August 31, 2004
INVENTOR(S) : Takizawa et al.

It is certified that error appears in the above-identified patent and that said Letters Patent is hereby corrected as shown below:

Title page,
Item [56], References Cited, OTHER PUBLICATIONS,
"Patent Abstract of Japan, JP 06-05216" reference, "JP-05216" should read -- JP-057216 --;
"Patent Abstract of Japan, JP 02-248482" reference, "Fujikara Kasei Co., Ltd." should read -- Fujikura Kasei Co., Ltd. --.

Column 34,
Line 67, "molecular weigh of" should read -- molecular weight of --.

Column 35,
Line 1, "5 to 40 part" should read -- 5 to 40 parts --.

Column 36,
Line 40, "a (meth)acrylic cater" should read -- a (meth)acrylic ester --.

Column 37,
Line 7, "structure formed" should read -- structure is formed --.
Line 8, "one or an" should read -- one of an --.
Line 36, "bond are polemized" should read -- bond are polymerized --.

Column 38,
Line 19, "curnyl" should read -- cumyl --.

Signed and Sealed this

Twenty-third Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,783,850 B2
DATED : August 31, 2004
INVENTOR(S) : Takizawa et al.

It is certified that error appears in the above-identified patent and that said Letters Patent is hereby corrected as shown below:

<u>Column 38,</u>
Line 21, "di-sec-peroxydicaxbonate" should read -- di-sec-peroxydicarbonate --.

Signed and Sealed this

Eighth Day of November, 2005

JON W. DUDAS
*Director of the United States Patent and Trademark Office*